United States Patent
Laberge et al.

(10) Patent No.: US 6,763,160 B2
(45) Date of Patent: Jul. 13, 2004

(54) OPTICAL CROSS CONNECT SWITCH HAVING IMPROVED ALIGNMENT CONTROL SYSTEM

(75) Inventors: Michel Laberge, Bowen Island (CA); Thomas W. Steiner, Burnaby (CA); Valentin Karasyuk, Ottawa (CA)

(73) Assignee: Creo SRL, Holetown (BB)

( * ) Notice: Subject to any disclaimer, the term of this patent is extended or adjusted under 35 U.S.C. 154(b) by 11 days.

(21) Appl. No.: 09/842,225

(22) Filed: Apr. 26, 2001

(65) Prior Publication Data

US 2002/0181840 A1 Dec. 5, 2002

(51) Int. Cl.$^7$ ................................................ G02B 6/26
(52) U.S. Cl. ............................ 385/17; 385/12; 385/13
(58) Field of Search ............................ 385/17, 9, 12, 385/13, 16, 18

(56) References Cited

U.S. PATENT DOCUMENTS

| | | | | |
|---|---|---|---|---|
| 4,120,583 A | * | 10/1978 | Hyatt ............................ | 355/86 |
| 4,172,994 A | * | 10/1979 | Bergkvist ...................... | 324/175 |
| 4,265,534 A | * | 5/1981 | Remijan ......................... | 356/2 |
| 4,333,009 A | * | 6/1982 | Stevens ..................... | 250/237 G |
| 4,596,925 A | * | 6/1986 | Gilby ....................... | 250/227.21 |
| 4,762,391 A | * | 8/1988 | Margolin ..................... | 385/119 |
| 4,775,788 A | * | 10/1988 | Harshberger et al. ....... | 250/235 |
| 4,831,252 A | | 5/1989 | Ihnat et al. | |
| 4,841,142 A | * | 6/1989 | Waszkiewicz ............... | 358/443 |
| 5,053,685 A | | 10/1991 | Bacchi | |
| 5,175,601 A | * | 12/1992 | Fitts ........................... | 356/604 |
| 5,177,348 A | | 1/1993 | Laor | |
| 5,206,497 A | | 4/1993 | Lee | |
| 5,459,578 A | | 10/1995 | Park et al. | |
| 5,524,153 A | | 6/1996 | Laor | |
| 6,005,998 A | | 12/1999 | Lee | |
| 6,097,858 A | | 8/2000 | Laor | |
| 6,097,860 A | | 8/2000 | Laor | |
| 6,101,299 A | * | 8/2000 | Laor ............................ | 385/16 |
| 6,498,685 B1 | * | 12/2002 | Johnson ..................... | 359/626 |

FOREIGN PATENT DOCUMENTS

| | | |
|---|---|---|
| EP | 0729050 | 8/1996 |
| EP | 0751415 | 1/1997 |
| EP | 0844502 | 5/1998 |
| EP | 0846969 | 6/1998 |

* cited by examiner

Primary Examiner—Frank G. Font
Assistant Examiner—Kevin Kianni
(74) Attorney, Agent, or Firm—Oyen Wiggs Green & Mutala

(57) ABSTRACT

A method and apparatus are disclosed for an optical fiber cross-connect switch incorporating an absolute position encoder and a magnetic actuation system into its alignment system. The switch comprises two optically opposed arrays of fiber-optic switching units, each of which contains a single fiber active to send or receive an optical communication signal. The magnetic actuation system comprising four magnetically polarizable actuator branches positioned surrounding the fiber and a magnetizable disk circumferentially attached to the fiber end. Selective magnetic polarization of the actuator branches bends the fiber end. A two-dimensional Moiré type position encoder determines the absolute position of the fiber end. The encoder comprises at east one plurality of radiation sources, which emits pulses of radiation (control signals) directed toward the switching units. Each switching unit is equipped with a reticle, an optical system that focuses the control signals onto the reticle, and a single photodetector, which measures the power of the control signals transmitted through the reticle. A controller uses the measured control signals to determine the two-dimensional position of the fiber in that switching unit and to generate actuation signals, which form the input for the actuation system.

58 Claims, 21 Drawing Sheets

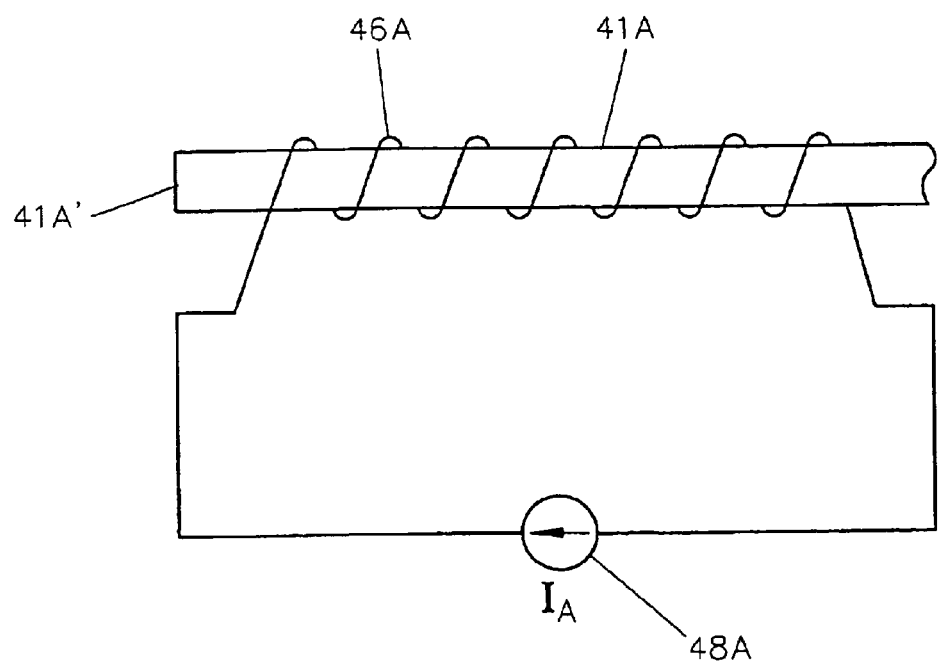
Figure 9-A
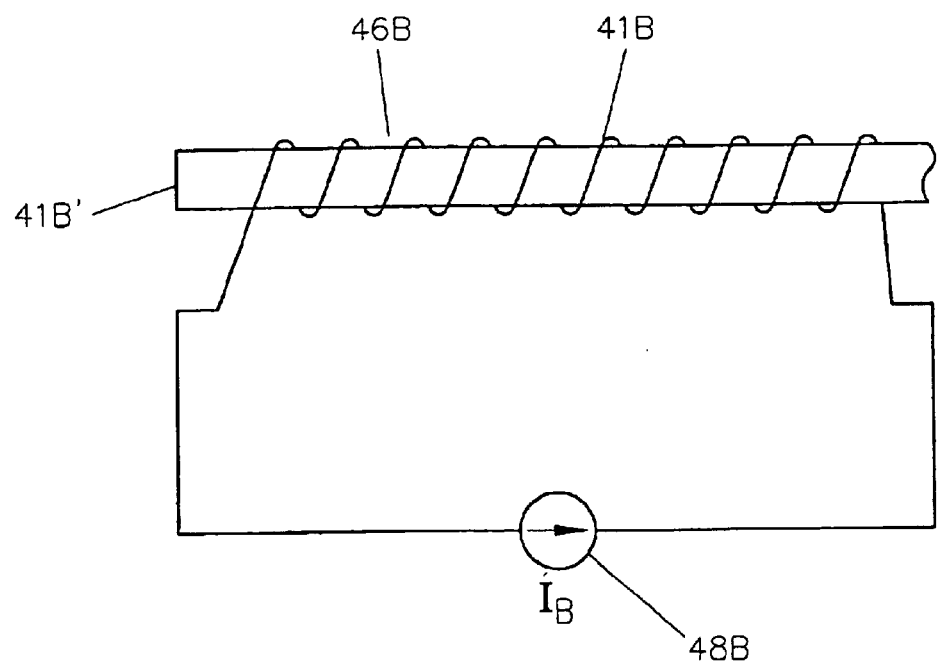
Figure 9-B

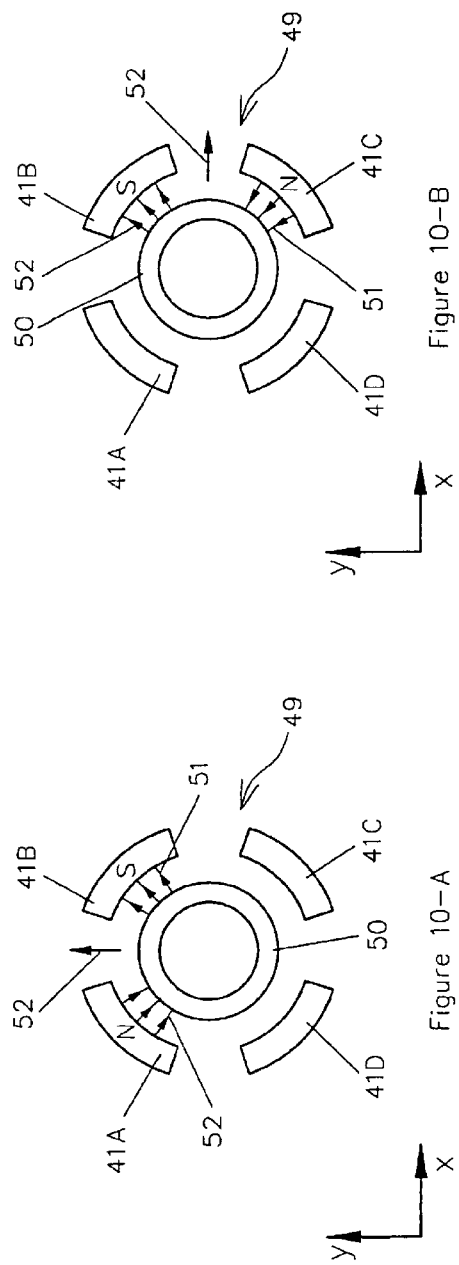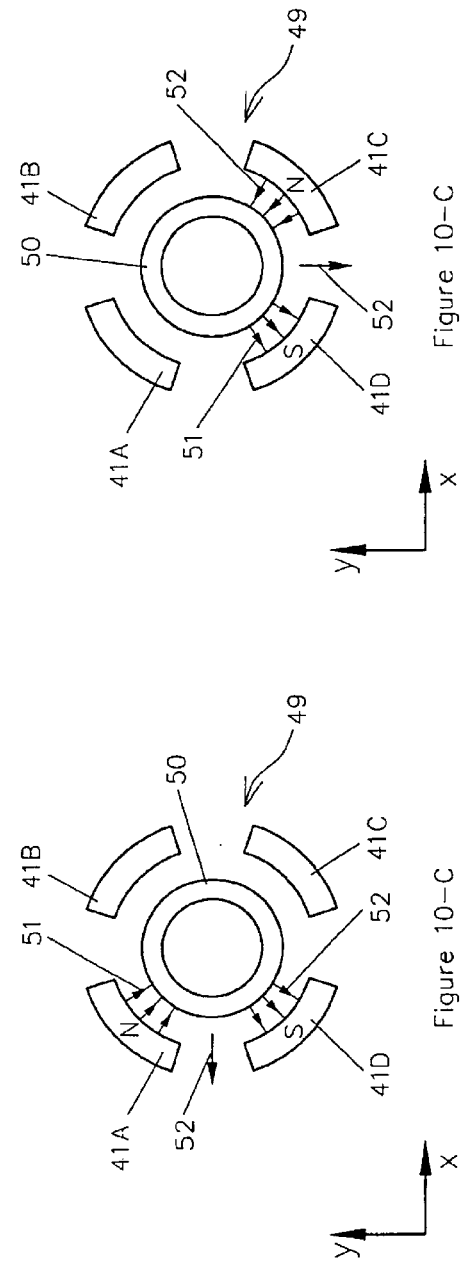
Figure 10

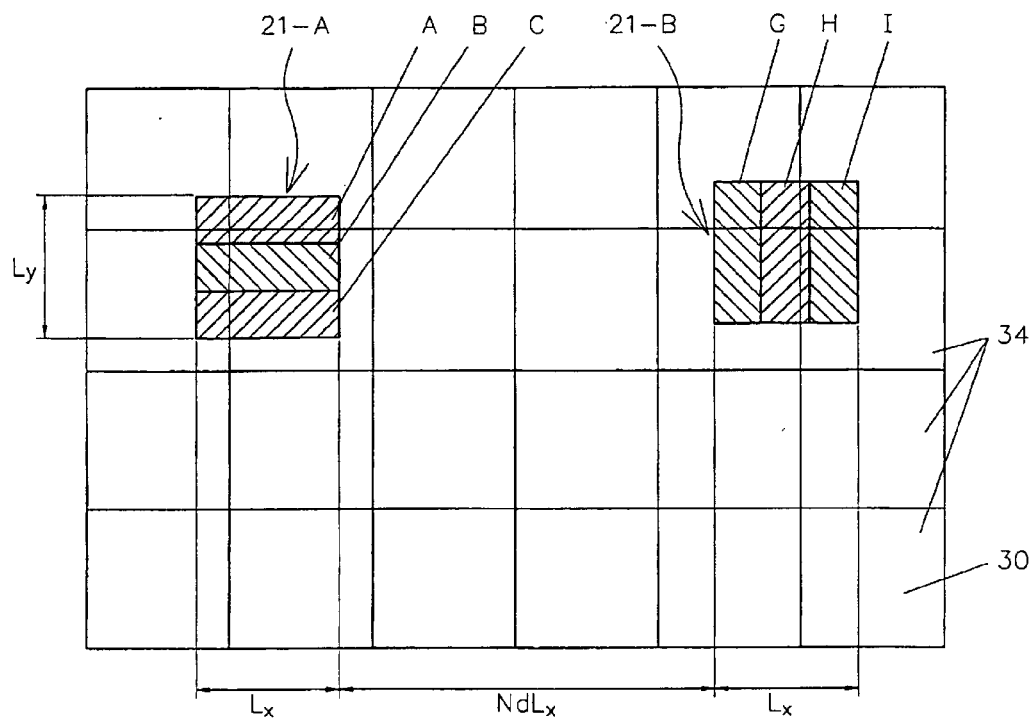
Figure 14-B
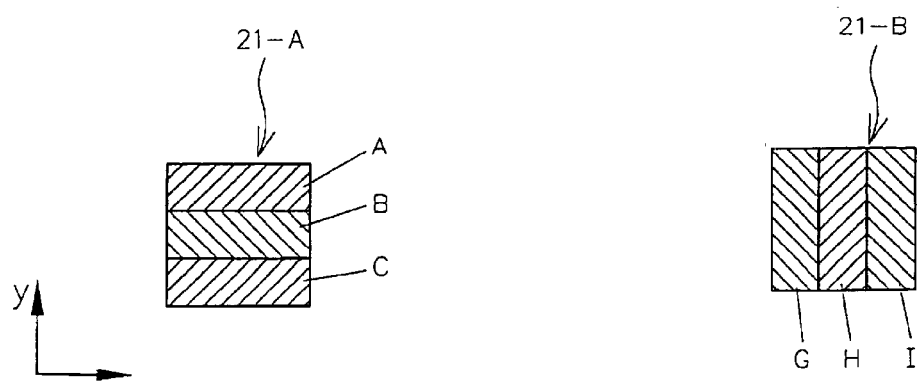
Figure 14-A

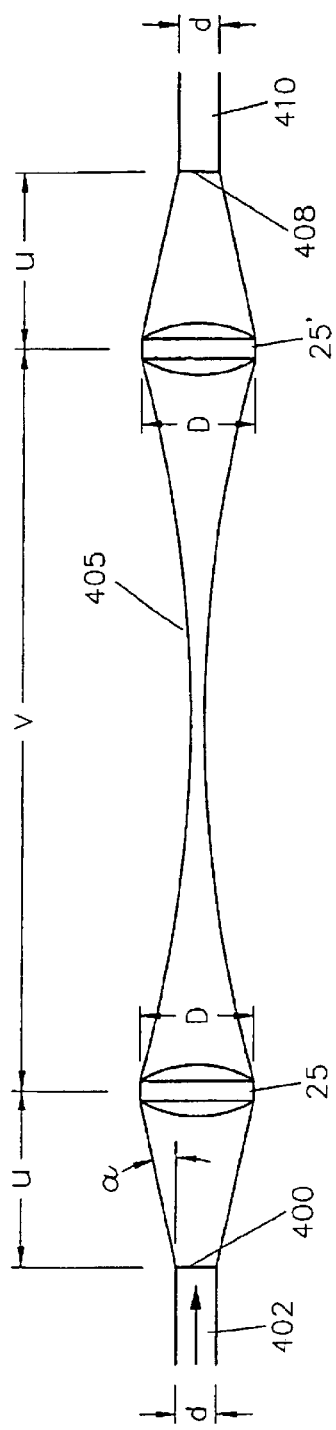
Figure 18-A
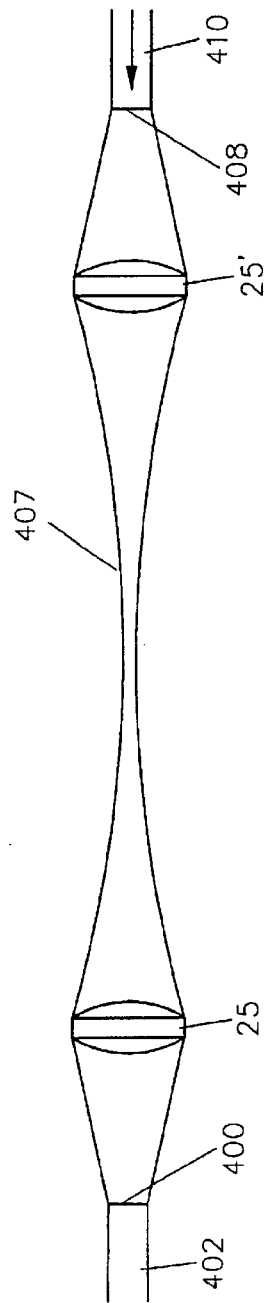
Figure 18-B

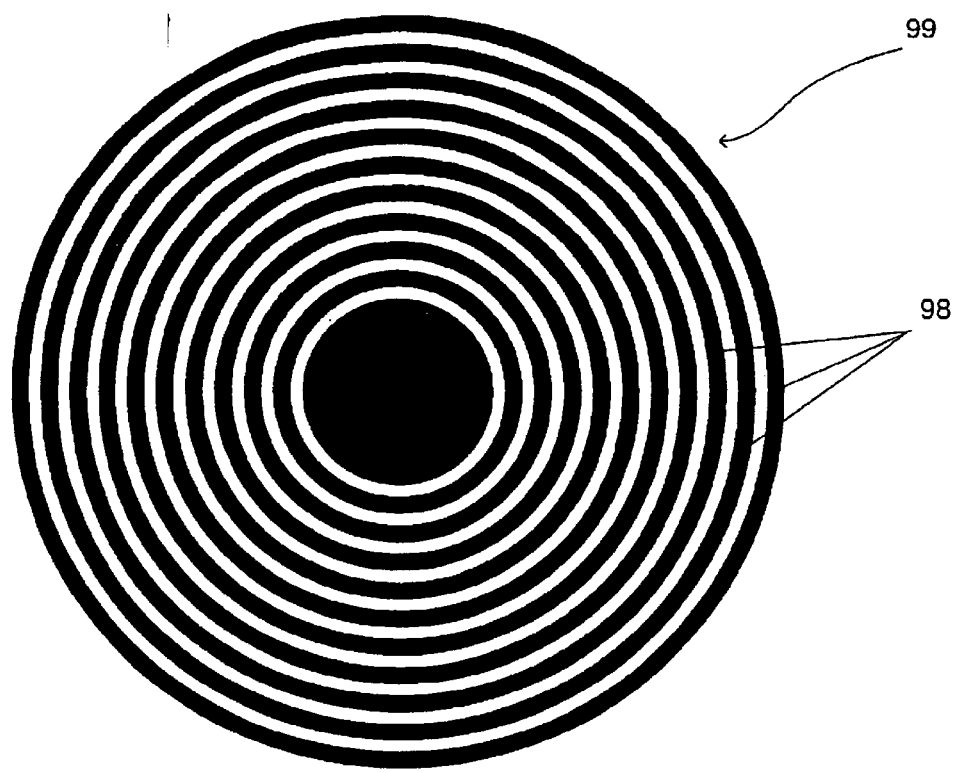
Figure 19-A
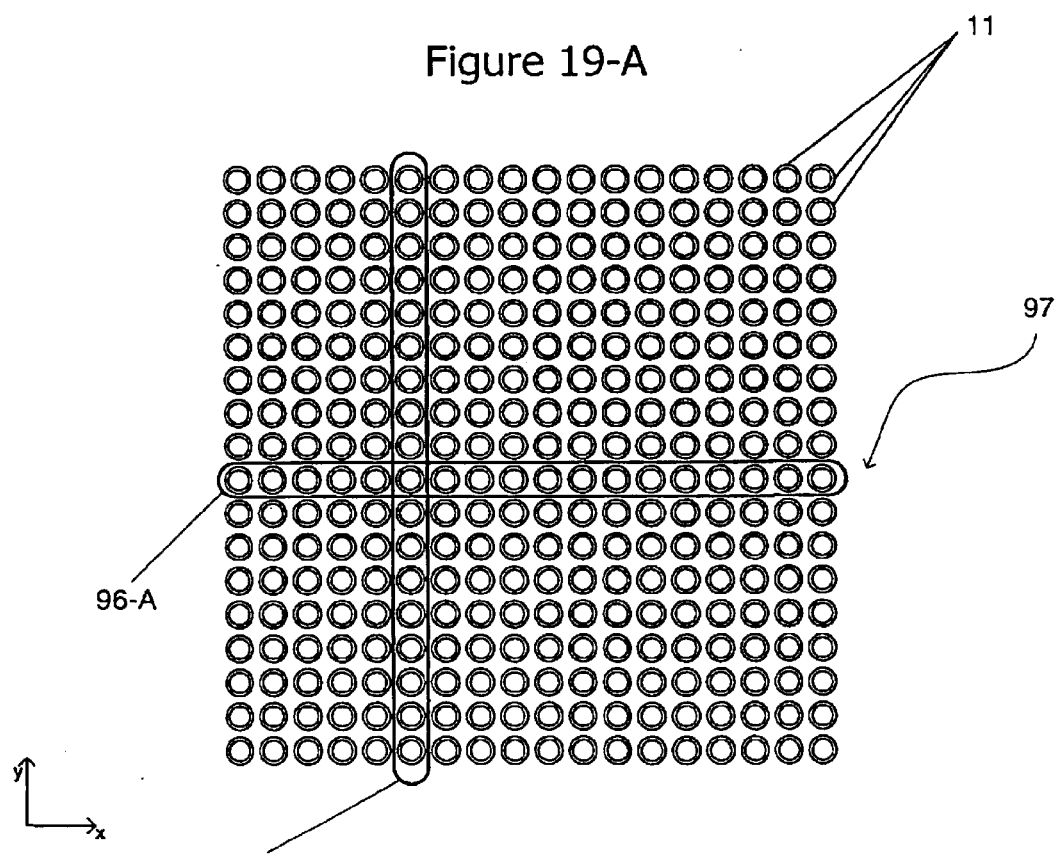
Figure 19-B

OPTICAL CROSS CONNECT SWITCH HAVING IMPROVED ALIGNMENT CONTROL SYSTEM

RELATED APPLICATIONS

The present application is related to U.S. patent application ENTITLED "ABSOLUTE POSITION MOIRÉ TYPE ENCODER FOR USE IN A CONTROL SYSTEM", filed Apr. 24, 2001 by Michel G. Laberge, Thomas W. Steiner and Valentin Karasyuk.

FIELD OF THE INVENTION

The invention disclosed herein relates generally to the field of optical switching. Specifically, the invention relates to alignment control systems for implementing the optical signal connection between fibers in optical cross-connect switches.

BACKGROUND OF THE INVENTION

Fiber optic systems are now in common use for transmitting optical communication signals, which are optical signals modulated to encode desired information. Such optical communication signals may be modulated with data, voice or video signals, and are typically transmitted across optical networks using optical fibers that support substantial transmission capacity. Given the continually escalating demand for improved signal quality and bandwidth, it is anticipated that the use of, and demand for, fiber optic communication will continue to increase.

One of the reasons that fiber optic networks have recently attracted attention relates to new methods of switching in the optical domain without having to convert the optical communication signals into conventional electronic signals for switching purposes. In this manner, conventional electronic switching components can be eliminated and higher bandwidth optical switches can be implemented in their place. Fiber optic communication lines may be switched by simply aligning the opposing ends of the fibers to be connected for direct optical linkage. Optical switching is advantageous when compared to conversion of optical communication signals to electrical signals for electrical switching, because optical switches can achieve higher bandwidth than comparable electronic switches. Consequently, network application having minimum bandwidth requirements can be achieved at overall lower costs by employing optical rather than electronic switching. It will be appreciated, however, that increasing switching speed and reducing signal degradation across the switch remains a continual desire.

Optical cross-connect switches may be understood to include a first array of fibers on one "side" of the switch and a second array of fibers on the second "side" of the switch. It will be appreciated after reading the disclosure below, that the first and second "sides" of a switch relate to optical signal transmission pathways and not to a spatial arrangement.

The control of optical switches involves alignment of the two fibers to be optically connected. Typically, external network information is received, identifying two optical fibers (one from either "side" of the switch) that are to be optically connected across a switch interface in order to permit transmission of communication signals therebetween. Alignment control involves identifying the first side fiber and the fiber on the second side that are to be optically interconnected, aligning and configuring an optical connection between the two fibers and fine tuning the optical connection between the identified fibers to optimise signal transmission.

Some older prior art optical cross-connect switches employ "one-sided" control systems for targeting and alignment. That is, the control system for aligning a particular transmitting fiber to a particular receiving fiber is resident on one "side" of the switch. Such alignment control systems attempt to control the trajectory of the communication signal based on known device geometry and pre-calibrated target positions. One example of such a system is U.S. Pat. No. 5,206,497 (referred to herein as the '497 patent), which controls the alignment of the transmitting fiber on the transmission "side" of the switch. The '497 patent discloses a fiber that transmits an optical communication signal to one of a plurality of receiving fibers on the other side of the switch. A small fraction of the power in the communication signal is split off from the main component of the beam using a beam splitting device. This split-off component of the beam, referred to as the monitor component, is directed towards a charge coupled device (CCD) optical detector. The CCD detector determines the position of the monitor component of the beam on the surface of the CCD detector and feeds this information back to the alignment control system. Using feedback information from the CCD detector, the alignment control system operates actuators, which effect the desired trajectory of the transmitting fiber. During calibration which takes place prior to use, a predetermined target position is identified, so that each receiving fiber is associated with a known target position on the CCD detector. In this manner, the alignment control system achieves the desired communication signal trajectory by directing the monitor component of the communication signal to impinge on the surface of the CCD detector at the desired target position.

A major drawback with the control system of the '497 patent is the requirement of a CCD sensor for each transmission fiber. CCD sensors are relatively expensive and increase the cost of the overall switch. An additional disadvantage of the '497 invention is the space required to split each communication signal to an independent CCD sensor, which prohibits miniaturization of the switch. Another limitation of the '497 patent is the dependence of the control system on the presence of the communication signal. When the system is "unlit" (i.e. no optical communication signal is being transmitted from one side of the switch to the other) it can not be controlled. The requirement for the presence of a communication signal prior to effecting control becomes a problem if it is desired to insert the switch in a communications network prior to use and then use the switch only when additional network capacity is required. The necessity of having the communication signal on during control is also problematic, because a signal may be inadvertently inserted into the wrong receiving fiber during a switching operation. Additional drawbacks with the '497 patent include: a limitation on insertion efficiency across the switch interface, because of a need to split off some of the transmitted power to form the monitor component of the beam for the control system, and a critical dependence on the geometry of the device.

Another drawback, common to all "one-sided control" switches (like that of the '497 patent) is that the numerical aperture (NA) of the receiving fibers prevents the implementation of very large switches. Recently, larger switches have been developed by having controllable fibers on both "sides" of the switch. That is, control of the communication signal trajectory is implemented on the transmission side of the switch and control of the angle at which the signal is inserted into the receiving fiber is controlled at the reception side of the switch. In this manner, the limited NA of the receiving fibers can be overcome.

An example of a "two-sided control" switch is U.S. Pat. No. 6,005,998 (referred to herein as '998), which comprises two arrays of light beam collimators arranged on either side of the switch. The control system comprises two motors, which each have an associated encoder to track their positions. The motors are used to effect a particular angle of a collimating lens. On the transmission side of the switch, the angle of the collimating lens is adjusted such that the beam of the transmission fiber is collimated and steered on both the x and y axes to a pre-calibrated target position on the other side of the switch. On the receiving side of the switch, two additional motors control the angle of a similar collimator lens. The angle of the collimator lens permits reception of the communication signal from the pre-calibrated target position and insertion of the communication signal into the receiving fiber at an appropriate angle, helping to overcome the limited NA of the receiving fibers.

A major drawback of the '998 patent is the requirement for two motors in each collimator unit (i.e. two motors for each transmission fiber and two motors for each receiving fiber). These motors are relatively expensive and they take up an inordinate amount of space, preventing miniaturization of the device. Another limitation of the '998 patent is that the encoders are only capable of determining relative position of the collimating lens; consequently, each time that the system is powered off and then restarted, it must be "zeroed" to achieve a reference position. Finally, as with the '497 patent, the system of the '998 patent is heavily dependent on the relative geometry of the components and if, after calibration, any device is dislocated or if the system geometry changes due to environmental conditions, such as vibration or temperature, the system will fail.

The current generation of optical cross-connect switches employs a "two-sided" control scheme optical control signals that are distinct from the communication signals that carry the data to be switched. The switch disclosed in U.S. Pat. No. 5,524,153 (hereinafter '153) has a target identification and alignment system involving the use of optical control signals associated with the first and second side fibers, where each fiber is housed in a switching unit. LED's or other radiation emitting devices (referred to herein as RED's) are interspersed with the fibers in the first and second arrays, thereby defining corresponding arrays of RED's positioned in a known manner relative to the fibers. Identifying a target fiber within the array of switching units can then be accomplished by lighting the RED's of the various rows and columns of the RED array in a particular pattern to identify the fiber that is to be targeted for connection. Pulsing of the RED's also provides a positional reference for fine tuning the alignment of the fibers on each side of the switch. As explained below, such targeting and alignment methods have certain limitations.

One principal limitation of the '153 patent relates to targeting in large capacity switches, such as a 256×256 or larger switch. In such instances, a sequence involving a relatively large number of RED pulses is required to identify a particular target fiber. With such a large number of pulses, the operational speed of the switch may be significantly reduced.

A second disadvantage of the invention disclosed by the '153 patent is the dependence of the alignment control system on the absolute radiation intensity of the measured pulses. The control system taught by the '153 invention involves a comparison of the absolute intensity of control signal radiation pulses on either side of the target fiber to develop an error signal. This dependence on absolute intensity leaves the alignment control system susceptible to variation in the intensity amongst the various control signal RED's and variation in the reception of the radiation from the various control signal RED's. For this reason, one RED that performs differently than the others can influence the successful operation of the device and be a singular point, where a failure may cripple the operation of the entire switch. It may also be difficult to identify the particular switching unit to which the defect belongs, making it difficult to repair a switch with an unusually performing RED.

A third drawback with the '153 invention is its requirement for another fiber dedicated to receiving optical control signals, referred to in the '153 patent as a "radiation guide". Each switching unit must contain both a data signal fiber to receive the communication signals and a radiation guide to receive the control signals. The invention discloses two types of radiation guides: (1) a dedicated second fiber that is completely distinct from the data signal fiber; and (2) a dual core fiber, where the data signals are received by the inner core and the control signals are received by the outer multimode core. The implementation involving a second distinct fiber has the disadvantage that both the data signal fiber and the control signal fiber must have access to the aperture of the switching unit. This layout takes up additional space in the lateral dimensions, increasing the overall size of the switching unit and limiting the range of alignment of the data signal fiber. The implementation involving the dual core fibers is relatively expensive, because of the cost of the dual core fiber and the special cable tapping techniques that are necessary to extract the control signals from the outer core of the dual core fiber.

Another limitation of the '153 patent is the requirement that the alignment control RED's are associated with, and located adjacent to, the apertures of each switching unit. Locating the RED's adjacent to the apertures of the switching unit increases the space required by each switching unit, thereby increasing the size of the overall switch, increasing the switching time and limiting miniaturization. In addition, the '153 invention discloses a group of control RED's that are associated with each switching unit. It is a requirement for the operation of the switch that each of these control RED's must be received and measured by the switching units on the opposite "side" of the switch. It will be appreciated that in larger switches (such as 256×256 or greater), the control RED's associated with the outermost switching units will be a relatively large lateral distance from the center of the switch interface. In order for radiation from these outermost control RED's to be received and measured by the switching units on the opposite side of the switch, the switching units will require a large NA. Thus, the association of the control RED's with the switching units limits the size of the switch that can be effected by the '153 invention for switching units having a particular NA.

U.S. Pat. Nos. 6,097,858, 6,097,860 and 6,101,299 (referred to herein as the "Laor patents") represent a series of patents related to the same prior art switch. As with the '153 patent, the Laor patents involve the use of a plurality of optical control signals associated with the first and second side fibers, where each fiber is housed in a switching unit. The Laor patents describe the use of two types of control signals referred to therein as targeting and alignment signals. In the Laor patents, there are a plurality of control signal RED's associated with each switching unit that emit control signals having a different wavelength from the communication signal, but that travel on a substantially similar optical path to that of the communication signal. Using a dichroic beam splitter, the control signals are split from the communication signal inside the receiving switching unit on the basis of this wavelength difference, so that the communication signal is directed towards the receiving fiber and the control signals are directed toward a sensor apparatus for control purposes. The Laor patents disclose the use of a variety of sensors, involving a single detector, a partitioned detector and a plurality of detectors to receive alignment and targeting signals and to feedback this information to a control system. The Laor patents improve on the '153 patent by including targeting information (i.e. information identifying the two fibers to be optically connected) in a coded signal from one of the control signal RED's. Once a targeting signal is decoded, the switching units associated with the two fibers to be optically connected can be actuated in an open loop manner to achieve approximate optical alignment based on a pre-calibrated target position. Thereafter, the control systems can measure the signals received from the alignment RED's and employ linear feedback control based on knowledge of the system geometry to fine tune the connection for communication signal transmission. The encoding of the alignment signals improves the switching speed of the device, because it does not require a drawn out pulsing sequence of the RED's in various rows and columns.

Although the Laor patents reduce the switching time by encoding the targeting signal, they suffer from a number of other disadvantages, some of which are similar to those of the '153 patent. A primary disadvantage of the Laor patents that is similar to that of the '153 patent is their dependence on the absolute radiation intensity of the radiation pulses from the alignment RED's. The control system taught by the Laor patents employs a comparison of the measured absolute intensity of various alignment RED pulses on various detectors to determine an error signal used to control its actuators. This dependence on absolute intensity leaves the entire system susceptible to variation in intensity amongst the various control signal RED's and variation in reception and measurement of the radiation from the various control signal RED's. For this reason, one RED that performs differently from the others can influence the successful operation of the device.

A second disadvantage of the Laor patents is the relatively large number of parts and optical interfaces within the switching units, both of which are greater than that of the '153 patent. The large number of parts increases the size, complexity and expense of the overall switch. In addition, the large number of optical interfaces required by the Laor patents decreases the optical transmission efficiency of the switch, because there are losses of optical intensity associated with each interface.

Another disadvantage of the Laor patents is the use of a limited number of alignment RED's coupled with relatively large radiation detector surfaces. This combination of factors results in a relatively weak control signal strength and a critical dependence on the signal to noise ratio of the detectors. Since only one alignment RED is incident on a detector surface at any given time, the detector must be sufficiently sensitive to detect the radiation from the RED and to produce a corresponding electrical signal that is discernible. Such sensitive detectors are susceptible to background radiation and other sources of noise, particularly when their surfaces are relatively large. Thus attempts to make the radiation detectors more sensitive result in lower signal to noise ratio. The problem of relatively weak signal strength from the single alignment RED and a critical dependence on signal to noise ratio of the detector is exacerbated by any losses that might occur at the beam splitter or any of the other optical interfaces within the switching unit. The Laor patents attempt to address this issue by breaking the sensor into smaller partitions, to improve the signal to noise ratio, but this causes a corresponding increase in the complexity and cost of the radiation detection devices.

In addition to the increased complexity and cost of the radiation detection devices disclosed by the Laor patents, the partitioned sensors of the Laor patents suffer from "migrating photon" effects near the edges of the sensor partitions. Eliminating migrating photons from such detectors represents an additional source of expense required to effect the switches of the Laor patents.

In a manner similar to that of the '153 patent, the Laor patents disclose control RED's that are associated with, and located adjacent to, the apertures of each switching unit. As discussed above in reference to the '153 patent, this design increases the space required by each switching unit, thereby increasing the size of the overall switch, increasing the switching time and limiting miniaturization. As also mentioned above, the requirement that each control RED be received and measured by the switching units on the opposite "side" of the switch limits the overall switching capacity of the switch. This limitation arises because each switching unit has a given NA and, in large capacity switches, the radiation from the control RED's associated with the outermost switching units is difficult for the opposing side switching units to receive and measure.

Another disadvantage of the Laor patents is the potential for stray radiation from the alignment RED's within a particular switching unit to influence the intensity measurement of the desired alignment signals coming from the opposing switching unit. Because the geometry of the switching units is relatively small and because the alignment RED's are located inside the switching units, there is a significant potential that radiation emitted by an alignment RED within a particular switching unit can reach the radiation detectors within that same switching unit. As discussed above, the radiation detectors associated with the Laor patents are required to be sensitive to measure the radiation emitted from a single alignment RED on the other side of the switch. This feature of the radiation detectors increases the possibility of measuring stray radiation emitted by the alignment RED's within the same switching unit. The Laor patents do not appear to disclose any techniques of minimizing the effect of this stray radiation on their control systems.

Current actuation techniques for optical cross-connect switches employ motors (such as the '998 patent), piezoelectric actuation schemes (such as the '153 patent and the Laor patents) and specialized electrostatic enabled micromachine actuators. Each of these actuator implementations suffer from their own unique drawbacks. More specifically, motors take up a relatively large amount of space, a relatively large amount of power, and suffer from backlash. Piezoelectric actuators suffer from hysteresis in their actuation profile and require large voltages, which may not be desirable in a fiber optic switch. Finally, electrostatic micromachine actuators must be specifically designed for each application; consequently, they are relatively expensive to produce.

It is an object of the present invention to provide a method and apparatus for an optical cross-connect switch having an improved alignment control system, which comprises an improved actuation system and an improved fiber position measurement system.

It is an object of the present invention to provide a method and apparatus for an optical cross-connect switch and an associated alignment control system to minimize the loss of optical power across the switch.

Another object of the present invention is to provide a method and apparatus for an optical cross-connect switching system and an associated alignment control system to maximize the switching speed of the switch.

Yet another object of the present invention is to provide an optical cross connect switch that embodies relatively simple and inexpensive components, so as to minimize the expense associated with the device. In particular, the present invention may be implemented using a single photodetector, rather than a CCD detector or a quadrature detector.

Still another object of the present invention is to provide a method and apparatus for an optical cross-connect switch that is sufficiently robust and well designed to withstand variation in environmental conditions and its component parts. In particular, it is an object of the present invention to overcome vibrations, heat induced changes in the size and orientation of the components, and variation in the intensity of various control signal radiation sources.

Another object of the present invention is to provide a modular optical cross-connect switch that minimizes the lateral space occupied by each switching unit, so as to further facilitate miniaturization.

Still another object of the present invention is to provide a method and apparatus for employing an absolute position encoding scheme in the alignment control system of an optical cross-connect switch. The absolute position encoder is operative to measure the position of a beam directing element, whose position influences an optical path of the optical signal to be switched.

Another object of the present invention is to provide an alignment control system wherein the alignment control system employs control signal radiation sources to establish the position of a beam directing element, but the control signal radiation sources are shared between all of the switching units, rather than the radiation sources being integral to a particular switching unit.

Yet another object of the present invention is to provide a method and apparatus using projected radiation and a reticle to generate a Moiré interference pattern, which pattern yields information about the position of a beam directing element in the switch.

There exists a need for an optical cross-connect switch that ameliorates at least some of the disadvantages of the prior art discussed above.

SUMMARY OF THE INVENTION

In another aspect of the present invention, the apparatus comprises first and second groups of optically opposed switching units, which are held in a support chassis. In addition, the switch has a plurality of rigidly mounted radiation sources that emit control signal radiation incident on the face of the support chassis and the various switching units. Each switching unit comprises a housing framework, which houses the fiber and secures it over a portion of its length, but allows an end portion of the fiber to bend. The switch employs an actuation system that receives actuation signals as input and, in response to those actuation signals, bends the end portion of the fiber. A position measurement system associated with each switching unit determines the actual position of the fiber end on two dimensions and a control system uses this information, along with well known control techniques, to calculate actuation signals required to move the end of the fiber to a desired position. The desired position of the fiber end achieves the necessary fiber alignment to effect a switching operation and to facilitate the transmission of optical communication signals across the switch. The position measurement system used to determine the actual position of the fiber end involves a reticle, which is affixed to the end portion of the fiber and has a predetermined spatial relationship to the fiber end. An optical system is used to project the images of at least two of the radiation sources onto the surface of the reticle and a photodetector measures the intensity of the control signal radiation that is transmitted through the reticle. In this manner, the control system is able to resolve a Moiré interference pattern from the portion of the control signal radiation that is transmitted through the reticle and use information contained in that Moiré pattern to calculate the actual position of the fiber end. Once the control system has determined the actuation signals required, the actuation system is operative to bend the end portion of the fiber in a manner such that the fiber end reaches the desired position. When one fiber end from each of the two optically opposed groups of switching units is aligned to its desired position, optical communication signals may be transmitted between the two fibers with a minimum amount of loss or signal degradation.

Preferably, the reticle used in the position measurement system may be positioned and affixed circumferentially around the end portion of the optical fiber. Advantageously, the control system may employ information from the present and historic actual position of the fiber end along with the desired position of the fiber end to determine the actuation signals. Preferably, the chassis may be further divided into two chassis elements, a first of which may hold the first group of optical fiber switching units and a second of which may hold the second group of switching units.

Advantageously, the control system disclosed by the present invention may be further operative to determine an absolute actual position of the fiber end. Such an absolute position measurement system may be effected by a reticle having a constant pitch and a variable aperture duty cycle on two orthogonal dimensions, a reticle having concentric circular non-transmissive areas, or a reticle having a constant pitch and having a periodic variation of aperture duty cycle on two orthogonal directions.

Advantageously, the surface of the reticle may further comprise a plurality of materials, each of which has wavelength dependent transmission properties. In such a case, the plurality of radiation sources may further comprise groups of radiation sources that have different wavelengths.

Advantageously, the surface of the reticle may further comprise a different plurality of materials, each of which has polarization dependent transmission properties. In such a case, the plurality of radiation sources or the optical system may be further operative to introduce multiple polarizations to the control signal radiation.

Advantageously, the control system disclosed by the present invention may be further operative to discern rotation of the end portion of the fiber.

Another aspect of the present invention discloses a method of aligning an optical fiber to a desired position on two dimensions. The method involves the initial steps of: (i) affixing a reticle in a predetermined relation to the end of the fiber in a manner such that the reticle is moveable with the fiber end; and (ii) providing a plurality of radiation sources that emit control signal radiation. The method then requires projecting the control signal radiation onto the reticle in a manner that produces images of the radiation sources on the surface of the reticle and detecting and measuring the resultant Moiré interference pattern of the radiation transmitted through the reticle. The Moiré interference pattern provides positional information of the fiber end on two dimensions, which is used to generate actuation signals. The final step involves moving the fiber in response to the actuation signals. This technique is repeated to ensure that the fiber end moves to the desired position and remains there.

Preferably, the projecting step may further comprise time division multiplexing pulses of control signal radiation from various groups of radiation sources within the plurality of radiation sources and the detecting step may further comprise de-multiplexing the pulses from the various groups of radiation sources. This technique may involve the additional step of providing timing information about the multiplexing and de-multiplexing of the pulses of the various groups of radiation sources.

Another aspect of the present invention involves a method and apparatus for a position measurement system for determining a position on two dimensions of a moveable end portion of a fiber in an optical cross-connect switch. The position measurement system comprises a reticle affixed to an end portion of the fiber in such a manner that it has a predetermined spatial relationship to the fiber and is moveable therewith. A plurality of stationary radiation sources emit control signal radiation and an optical system projects the control signal radiation onto the surface of the reticle, so as to form images of the radiation sources on the surface of the reticle. A photodetector measures the intensity of the control signal radiation transmitted through the reticle and a control system discerns a Moiré interference pattern from this measured radiation. Using information contained in the Moiré interference pattern, the control system determines the position of the fiber on two dimensions.

Still another aspect of the present invention is an actuation system for moving the end of a fiber in an optical cross-connect switch on two dimensions. The actuation system comprises a housing framework, which houses the fiber and secures it over a portion of its length, but allows an end portion of the fiber to bend. A magnetically responsive element is affixed to the end portion of the fiber and is moveable along with the end portion of the fiber. An actuation element is disposed around a circumferential perimeter of the fiber in a location near to the secure part of the fiber. The actuation element further comprises a plurality of actuator branches, which are disposed at regular intervals around the circumferential perimeter of the fiber and extend toward the end of the fiber. Each actuator branch has a coil of wire wrapped around a portion of its length. Finally, a plurality of current sources is operative to deliver current to the coils of wire wrapped around the respective actuator branches. Delivery of current to the coils of wire creates a magnetic field in the vicinity of the actuator branch, creates a magnetic force on the magnetically responsive element, and moves the fiber end.

Advantageously, the actuation element may be made out of a magnetically polarizable material.

Preferably, the actuator branches may extend past the end of the fiber, so as to create a component of force oriented parallel to the central axis of the secure part of the fiber. This force component prevents the fiber from bending in more than one location.

Still another aspect of the present invention involves a method of moving the end of a fiber in an optical cross-connect switch in two dimensions. The method comprises the steps of: (i) providing an actuation element, which is disposed around a circumferential perimeter of the fiber in a location near to the secure part of the fiber. The actuation element further comprises a plurality of actuator branches, which are disposed at regular intervals around the circumferential perimeter of the fiber and extend toward the end of the fiber. Each actuator branch has a coil of wire wrapped around a portion of its length; (ii) providing a magnetically responsive element, which is affixed to the end portion of the fiber and is moveable along with the end portion of the fiber; and (iii) introducing current into the coil of wire around at least one of the actuator branches, so as to create a magnetic field in the vicinity of the actuator branch, create a magnetic force on the magnetically responsive element, and move the fiber end.

These and other objects of the present invention will be better understood from the following more detailed description along with the drawings and the accompanying claims.

BRIEF DESCRIPTION OF THE DRAWINGS

FIG. 9 depicts the method used to impart a magnetic polarization on the actuator branches.

FIG. 10 shows how the magnetic actuation system of the present invention can be used to move a fiber end in any direction on a two dimensional surface.

FIG. 14 depicts a schematic diagram of the radiation banks in accordance with a simplified embodiment of the present invention, which is useful for mathematically explaining the principles incorporated in the present invention.

FIG. 18 is a schematic diagram that depicts how the communication signals are focused and transmitted across the switch interface.

FIG. 19-A depicts a circularly oriented reticle in accordance with a particular embodiment of the present invention and FIG. 19-B depicts a radiation bank embodiment that is particularly well suited to correspond with the circularly oriented reticle.

DESCRIPTION OF THE PREFERRED EMBODIMENT

The invention described herein relates to an optical cross-connect switch and the associated alignment control system. Specifically, the invention relates to improved actuation and fiber position measurement systems deployed within the alignment control system. In general, the switch embodiments described herein are M×N type switches used in optical networking, where any one of M first fiber lines is selectively connectable to any one of N second fiber lines, so as to direct light containing optical communication signals there between. The alignment control system described in this disclosure relates to the method and apparatus for receiving an external command indicating that one of the M first fibers is to be optically connected to one of the N second fiber lines and for actuating and aligning the fiber ends in such a manner that the externally commanded connection is effected. The alignment control system involves many different subsystems, which are described in more detail below. Two particular subsystems involved in alignment control are the actuation system and the fiber position measurement system. The actuation system described in the ensuing description of the preferred embodiment relates to the mechanism for moving and aligning a particular one of the M first fiber lines and a particular one of the N second fiber lines, so as to facilitate the transfer of optical communication signals between them. The fiber position measurement system employs a plurality of optical control signals, a specifically designed reticle and a photodetector for each fiber to effect a two-dimensional Moiré type position encoder. Although both the actuation and fiber position measurement systems of the present invention have significant benefits over the prior art systems, it is believed that the configuration and the attendant advantages will be best appreciated upon gaining a full understanding of the optical switch as a whole and the environment in which the alignment control system operates. Accordingly, the following disclosure is divided into sections and subsections, which include: (1) the optical switch; (2) chassis design and control signals; (3) switching unit and control system; (4) actuation system; (5) fiber position measurement system; (5.1) the reticle; (5.2) radiation banks, radiation stripes and phase signals; (5.3) phase normalization; (5.4) calculation of the coarse position and the fine position; and (6) alternative embodiments and improvements.

It should be mentioned at this stage that words "light" and "radiation" are used interchangeably in this disclosure, and any use of the word "light" is not limited to the visible spectrum and should be understood to encompass electromagnetic radiation of any wavelength.

1. The Optical Switch

Figure 1A:
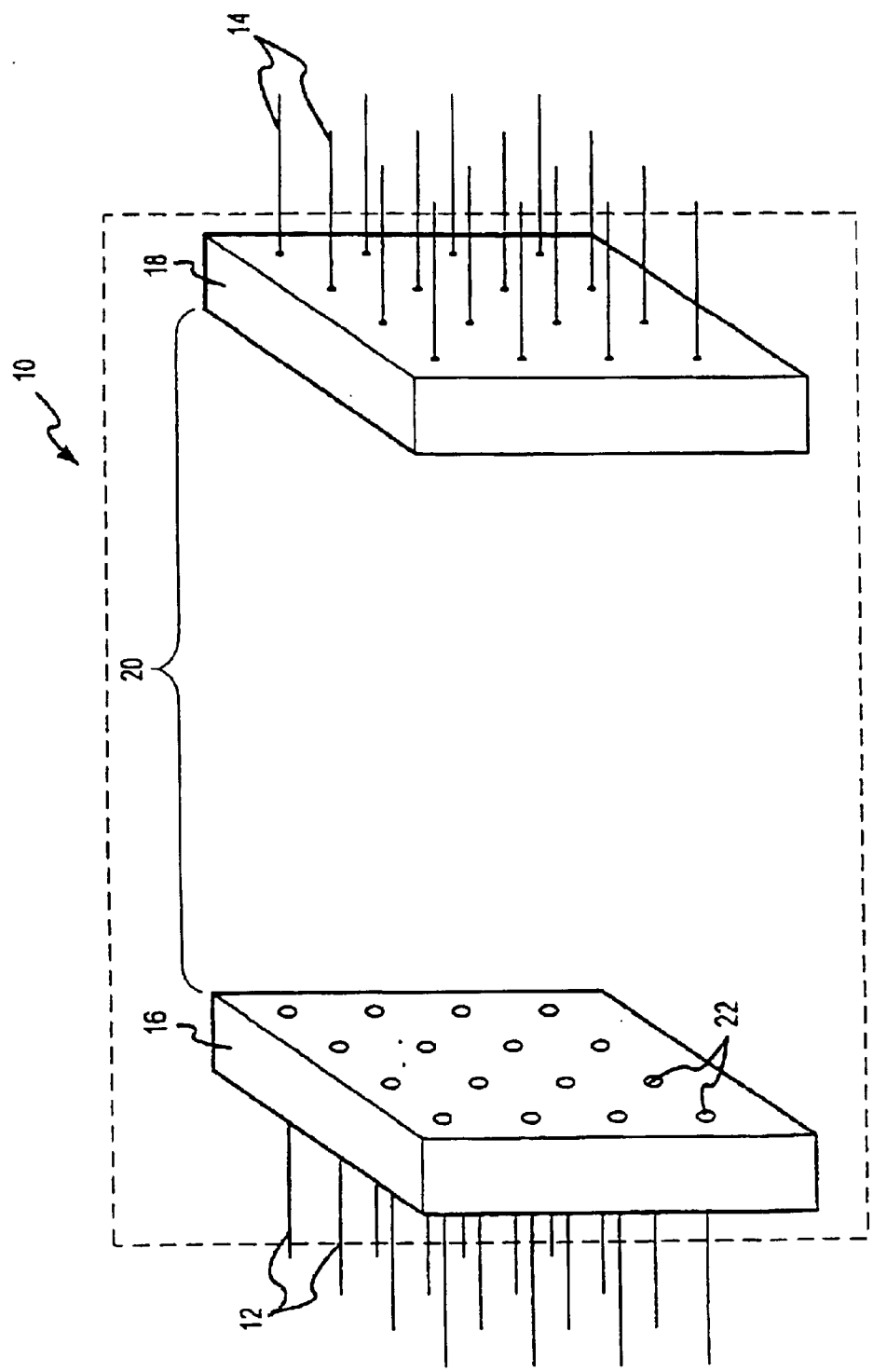
FIG. 1 depicts various optical cross-connect switch implementation architectures for creating the optically opposing "sides" of the switch.
Figure 1B:
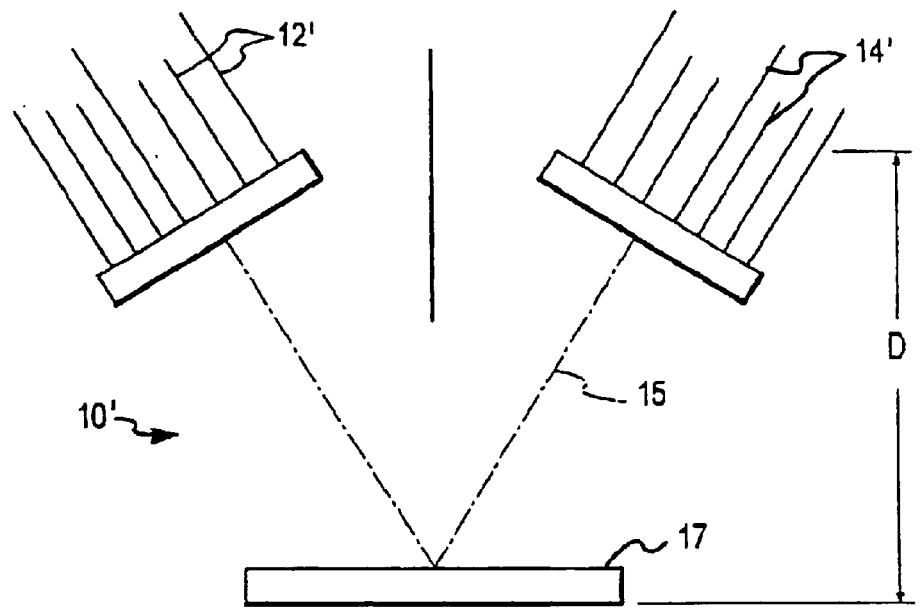
Figure 1C:
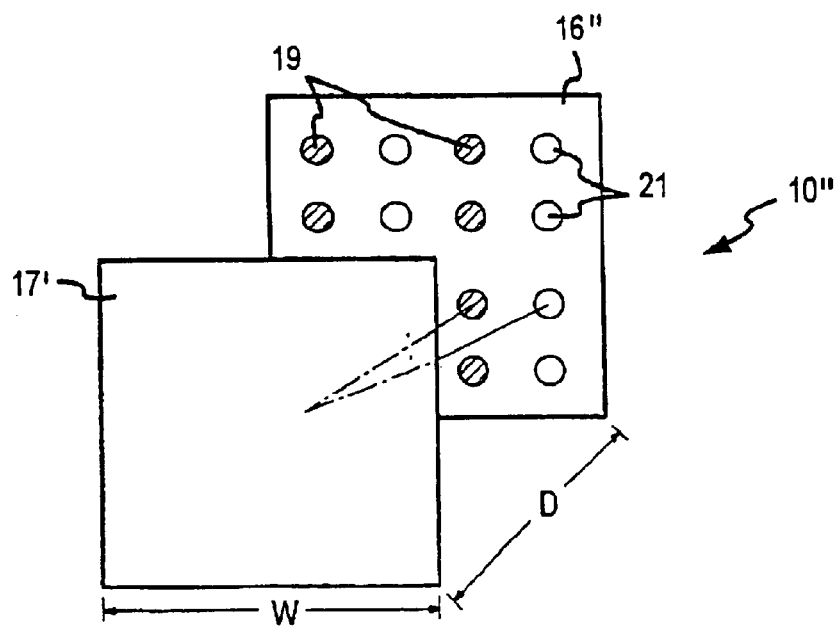

FIGS. 1A–1C depict schematic representations of possible configurations of an M×N switch of the type described herein. Although the embodiments of FIGS. 1A–1C all show 16×16 switches, it will be appreciated that practical embodiments may include fewer fibers or possibly many more. For example, it is envisioned that the invention as described herein may form the basis of a 1024×1024 switch or possibly an even greater number of line connections. The advantageous design of the switch described herein facilitates adjustment of the switching capacity and other features of the switch to suit the parameters of a particular optical communication network.

FIG. 1A depicts a simplified embodiment of an opposing chassis configuration for a switch 10, where the switch comprises a first chassis 16 that is located directly opposite the second side chassis 18. Each of the fibers 12 mounted in the first side chassis 16 may be optically connected to one of the fibers 14 in the second side chassis 18. Once made, the optical connection between each of the first side fibers 12 and the second side fibers 14 allows for bi-directional communication of data modulated into an optical communication signal between the first and second sides of the switch 10. Typically, communication signals employed in today's optical communication networks have wavelengths of λ=1310 nm and λ=1550 nm. However, communication signals of these wavelengths are not a requirement of the invention and a switch incorporating the principles of the invention may be fabricated for communication signals of any wavelength. In this disclosure, the phrase "communication signal" or "optical communication signal" is used to refer to any form of signal modulated onto a light beam emitted by the transmission fibers on one side of the switch and received by the receiving fibers on the other side of the switch, This specifically includes, without limitation a zero modulation signal that results in a constant wave optical beam.

The first chassis 16 and the second chassis 18 are separated by a transmission cavity 20. Preferably, the transmission cavity 20 is relatively empty, so as to facilitate non-blocking transmission of communication signals between any of the fibers 12 on the first side and any of the fibers 14 on the second side. Each chassis comprises a plurality of switching units 22 and each switching unit 22 is associated with a single fiber 12 or 14. To achieve the required fiber density to effect a 1024×1024 switch, the preferred embodiments of the invention involve packing many switching units 22 into the area of the chassis 16 and 18. In addition to switching units 22, the preferred embodiment also includes alignment control signals and sources, which are located on the face of the chassis 16 and 18, but are not shown in FIG. 1. Each of the switching units 22 comprises a lens (not shown) at its extremity, which is operative to shape the radiation beams of the communication signals emanating from the end of (or entering the end of) the fibers 12 or 14 and to help to make the optical connection of the communication signals between the two sides.

The depiction in FIG. 1A illustrates two chassis 16 and 18 in an opposing orientation; however, it will be appreciated as more fully explained below, that other physical arrangements and associated folded optical pathways may be implemented using optical elements, such as lenses and mirrors. FIG. 1B shows an alternative embodiment of the switch 10', where a flat mirror 17 is introduced between the two "sides" of the switch 10', in such a manner that any fiber 12' on the first "side" of the switch 10' may be optically connected with any one of the fibers 14' on the other side. The folded optical pathway indicated generally by phantom line 15 illustrates a typical optical path of the communication signals associated with such a connection. It will be appreciated that a switch such as the one depicted in FIG. 1B can be implemented using multiple folds in the optical pathway, so as make the switch 10' conform to the required physical dimensions.

FIG. 1C shows another implementation of a switch 10, which employs only one chassis 16" that faces a flat mirror 17'. The switch 10" has both transmitting switching units 19 and receiving switching units 21. This configuration can also be used to make the switch 10" conform to the required physical dimensions. Although only three configurations have been described, it will be appreciated that using simple optical elements, many possible configurations can be implemented, provided that these configurations allow for optical path connection between fibers.

In this disclosure, the word "side" is used to denote one of two fibers that are optically opposed to one another and should be interpreted with this general meaning. It will be appreciated from the above drawings and discussion that a "side" may transmit or receive optical communication signals and is not necessarily physically distinct from or adjacent to the opposing "side".

2. Chassis Design and Control Signals

In order to facilitate the switching of communication signals between any transmission fiber on one "side" of the switch and any receiving fiber on the other "side", the invention employs an alignment control system. One aspect of the alignment control system is the fiber position measurement system, which comprises a two-dimensional "Moiré type" position encoder. The encoder uses optical control signals (referred to in this disclosure at various times as "control signals" or "phases") from a plurality of radiation sources mounted on each chassis. The two-dimensional position encoder employed in this invention is substantially similar to that disclosed in the related application described above, which is hereby incorporated by reference. The radiation sources used by the encoder to form the control signals are mounted on each chassis in such a way as to be interspersed in a pattern between the various fibers and switching units on that particular chassis. In a preferred embodiment, the control signal radiation sources are radiation emitting diodes (referred to herein as RED's), which have a wavelength of $\lambda$=940 nm. As will be explained below, the wavelength of $\lambda$=940 nm is selected to optically distinguish the control signals emitted from the RED's from the communication signals (typically $\lambda$=1310 nm or $\lambda$=1550 nm). In addition, the invention incorporates Si based photodetectors, which are sensitive to the control signal radiation at $\lambda$=940 nm, but blind to the communication signals with a higher wavelength. Among other factors, RED's are chosen because of their low cost and their ready availability (i.e. relative to other radiation sources).

Notwithstanding the implementation of the preferred embodiment, the radiation sources used by the alignment control system to generate control signals may be any type of radiation emitter and the light that they emit may be any wavelength. In general, the invention should be understood to incorporate any such radiation emitting devices.

Figure 2:
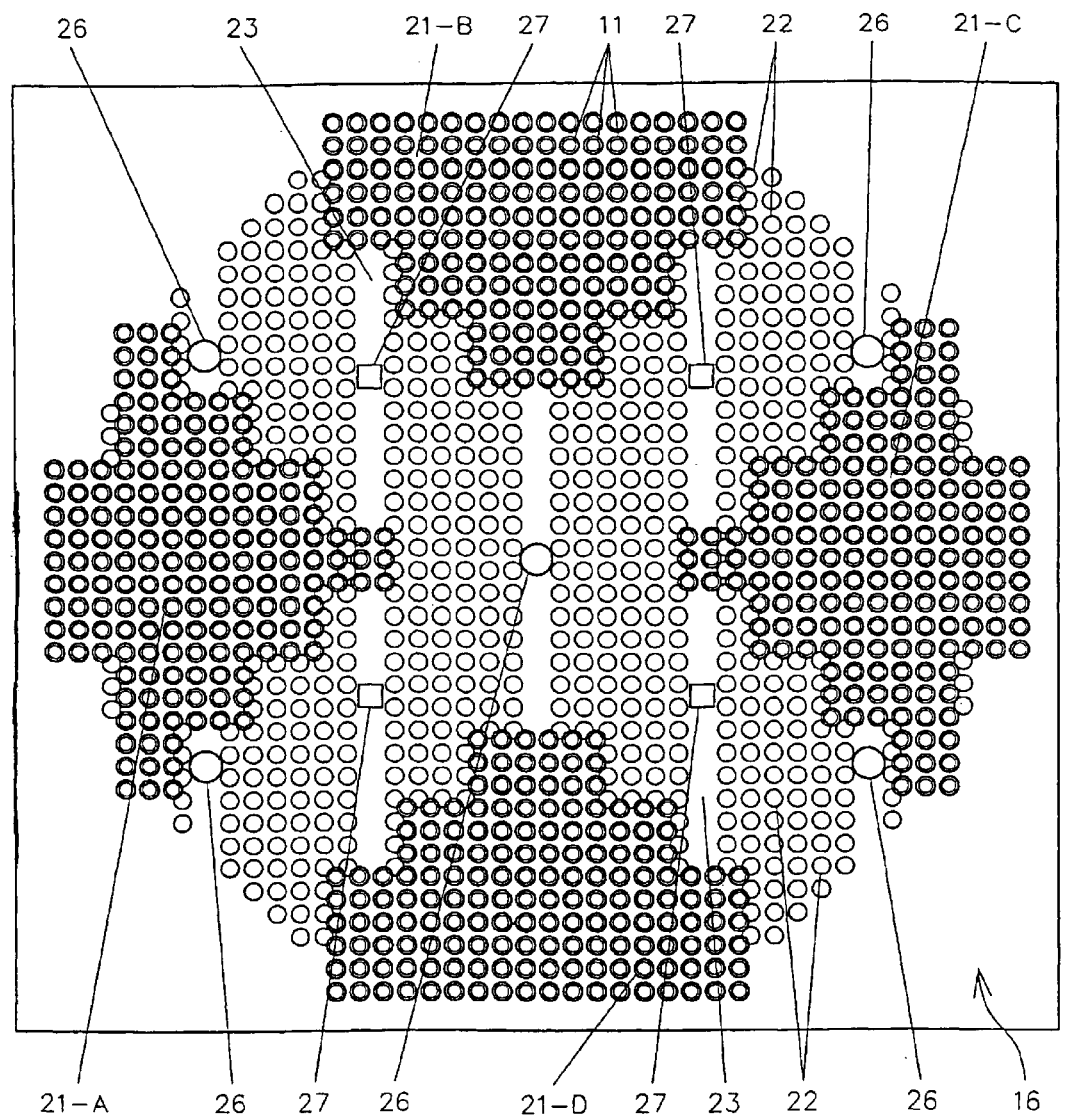
FIG. 2 depicts a the chassis of the optical cross-connect switch in accordance with one embodiment of the present invention. The chassis incorporated both radiation banks and interleaved switching units.

FIG. 2 depicts a plan view of chassis 16 representing one "side" of an optical switch in accordance with a particular embodiment of the invention. The other "side" of the switch (not shown in FIG. 2) has a chassis substantially similar to that of FIG. 2. The chassis 16 of FIG. 2 depicts a possible layout of the control signal RED's 11 and the switching units 22. FIG. 2 shows that the control signal RED's 11 are arranged into four groups (21A, 21B, 21C and 21D), which are referred to in this application as "radiation banks".

It should be noted here, that in contrast to prior art systems, the individual control signal RED's 11 are not associated with any particular switching units 22 or any particular fiber (not shown). In fact, the entire plurality of control signal RED's 11 is associated with the fiber position measurement aspect of the alignment control system. In this sense, the invention does not require that the control signal RED's 11 be interspersed with the switching units 22. In fact, the control signal RED's 11 may be located entirely separately from the switching units 22, provided that they are in optical communication with the switching units 22 on the other "side" of the switch.

Figure 3:
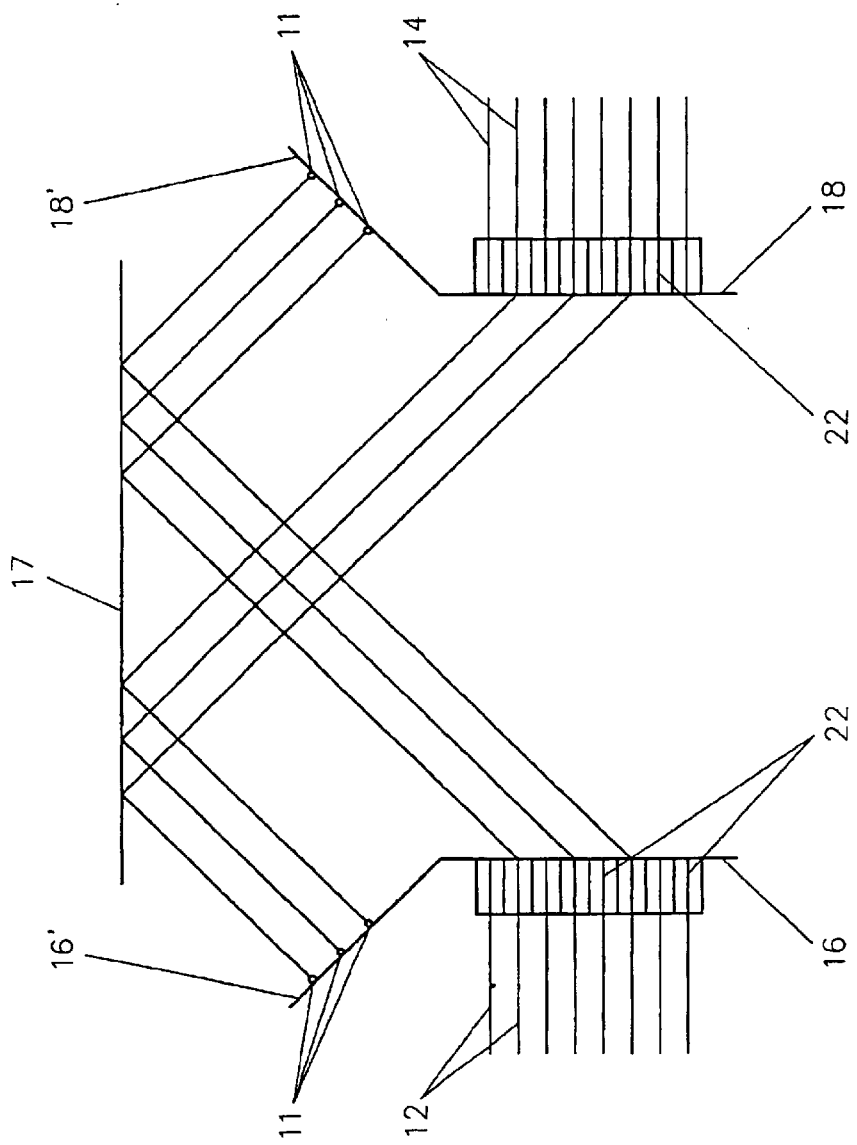
FIG. 3 depicts an alternative embodiment of the chassis of the optical cross-connect switch, where the physical location of the radiation banks is completely separate from that of the switching units.

An implementation having control signal RED's 11 that are separated from the switching units 22 is depicted in FIG. 3. FIG. 3 depicts two optically opposed chassis 16 and 18, which house the switching units 22. Each chassis 16 and 18 has a separate component 16' and 18', which contains the control signal RED's 11. Communication signals are communicated directly between the fibers 12 and 14 associated with each of the switching units 22. On the other hand, the control signals from the RED's 11 on chassis component 16' are reflected off of the mirror 17 and onto the face of chassis 18. Similarly, the control signals from the RED's 11 on the chassis component 18' are reflected off of the mirror 17 onto the face of the chassis 16. As will be explained in detail below, the only general requirement is that the control signals from the opposite "side" of the switch are incident on the face of the switching units 22, so that their radiation may be received by the switching units 22 and imaged onto a reticle (not shown) contained therein. In this sense, it will be appreciated that because of the individual control signal RED's 11 are not associated with any particular switching units 22 or fibers 12 or 14, there are many physical implementations of the control signals using lenses, mirrors and other optical elements capable of achieving the required functionality. The invention should be understood to incorporate different physical implementations of this type.

Figure 4:
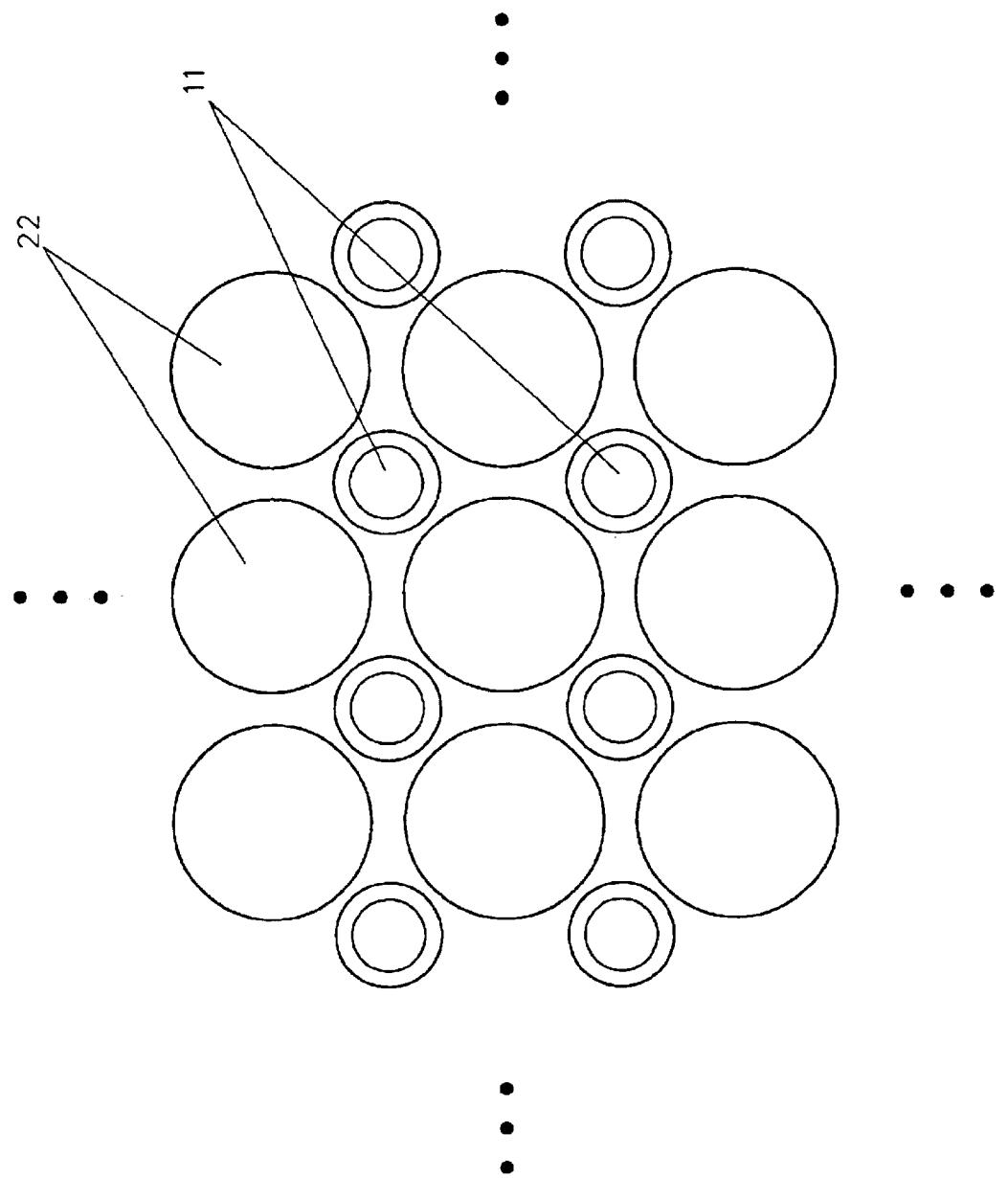
FIG. 4 depicts a scheme of packing the control signal RED's between the intervals in the switching units on the chassis.

Referring back to the embodiment of FIG. 2, the individual control signal RED's 11 in the radiation banks (21A, 21B, 21C and 21D) are tightly packed between the switching units 22 so as minimize the size of the chassis 16 and the overall size of the switch. Obviously, it is advantageous to be able to switch as many fiber lines as possible using as little space as possible; consequently, in the regions of the radiation banks (21A, 21B, 21C and 21D), each individual control signal RED 11 is packed between four adjacent switching units 22. In this manner, a large number of switching units 22 can be located on the chassis 16, because the control signal RED's 11 necessary to implement the alignment control system can be packed between the various rows and columns of switching units 22. FIG. 4 shows a close up depiction of a number of switching units 22 and control signal RED's 11 on the chassis 16 in the region of a particular radiation bank 21A. It should be noted that the arrangement of FIG. 4 is not the only scheme for closely packing the control signal RED's 11 and the switching units 22. The invention should be understood to incorporate other simple packing schemes designed to maximize the number of switching units 22 and maintain the required number of control signal RED's 11 on a two dimensional chassis surface. It should also be appreciated that the dimensions of the switching units may vary from implementation to implementation or even as between individual fibers within a particular switch.

FIG. 2 depicts two Cartesian axes x and y. These axes are useful to describe the invention are used throughout this disclosure. It will be appreciated that the axes x and y are not uniquely chosen and there is nothing other than the orthogonality of the two axes that forms a part of the invention. FIG. 2 also depicts three regions 23 oriented along the y axis, where there are no switching units 22. These regions 23 are used for mounting the chassis 16 to the switch 10, mounting the switching units 22 to the chassis 16 and, to house calibration sensors 26, which are employed to calibrate the alignment control system prior to use. Calibration sensors 26 can advantageously be selected to be a Germanium photodetector which is sensitive to the wavelengths of $\lambda=1310$ nm and $\lambda=1550$ nm commonly used in firer transmission but not to the wavelength of the RED's in this particular embodiment. In a calibration procedure light directed through each fiber can be directed on the calibration sensors 26 which act as targets. With a knowledge of the geometry of the sensor location on the Chassis with respect to the switching units the system can be calibrated.

The exterior surface of each switching unit 22 depicted in FIG. 2 comprises a lens (not shown), which is operative to focus radiation entering or exiting the switching unit 22. The switching units 22 either transmit or receive communication signals from their associated fibers (not shown) depending on whether the particular fiber within the switching unit 22 is in a transmitting mode or a receiving mode. In addition to the communication signals, both the transmitting and the receiving switching units 22 receive control signals from the control signal RED's 11 on the opposing "side" of the switch. The components and the associated functionality of the switching units 22 will be explained in more detail below.

Figure 5:
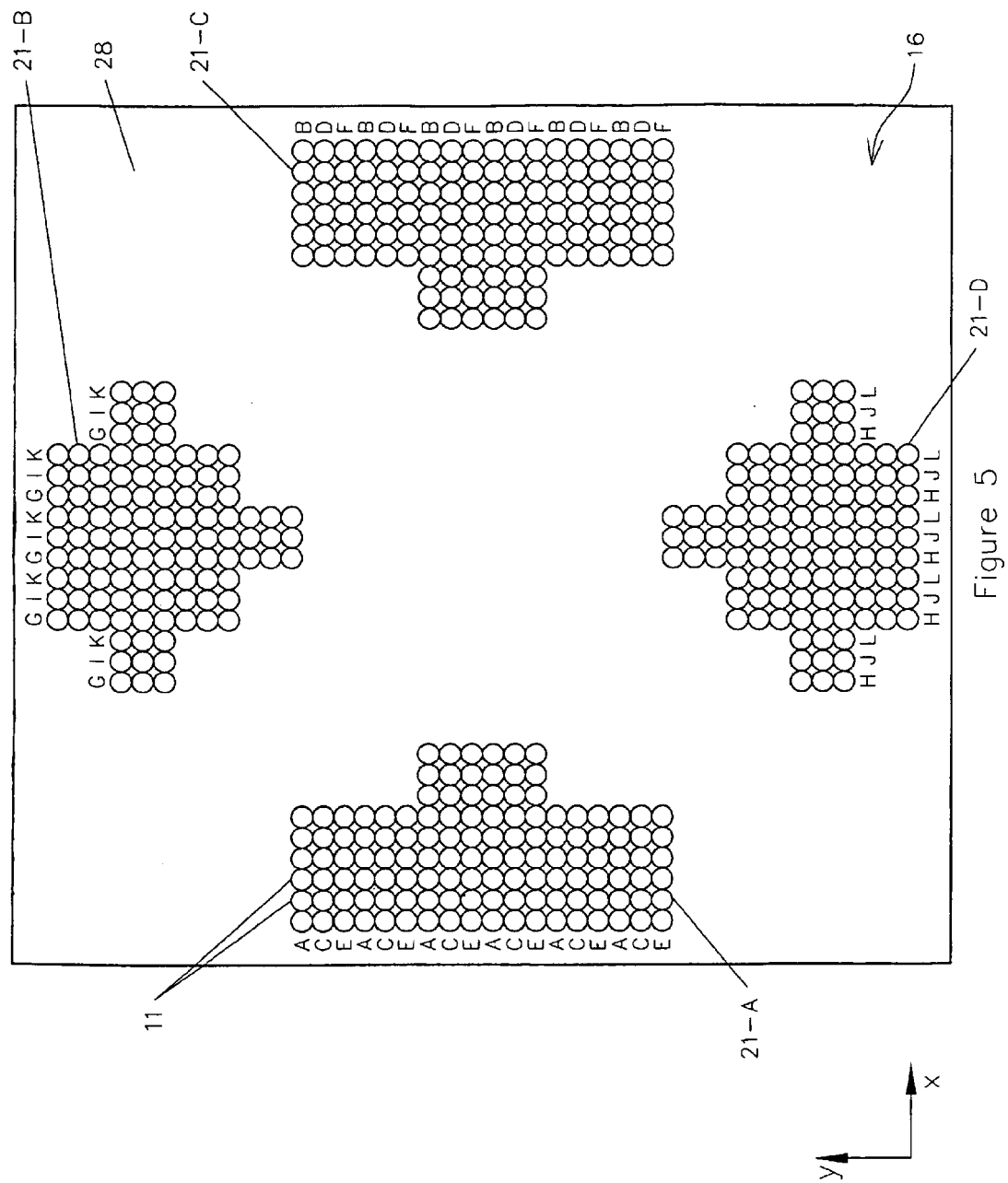
FIG. 5 shows an embodiment of the radiation banks, the radiation stripes and the associated phases on the chassis. For reasons of clarity, the switching units are not shown in FIG. 5.

FIG. 5 depicts a chassis 16 and the associated control signal RED's 11 for a particular embodiment of the invention. For ease of reference and discussion, the switching units 22 are not shown in FIG. 5. The preferred embodiment of the invention comprises four radiation banks (21A, 21B, 21C and 21D). In general, the fiber position measurement system of the present invention only requires two such radiation banks to effect a two-dimensional position encoder; however, as will be explained below, the extra radiation banks are used to accommodate rotation and shadow from the fiber. Each radiation bank (21A, 21B, 21C and 21D) comprises several spatially periodic groups of radiation stripes (A through L) made up of rows or columns of RED's 11. FIG. 5 shows that radiation bank 21A comprises several spatially periodic groups of radiation stripes (labelled A, C and E) oriented along the x-axis. Radiation bank 21C also contains several groups of spatially periodic radiation stripes (B, D and F) oriented along the x-axis. Similarly, radiation bank 21B contains periodic groups of radiation stripes (G, I, K) and radiation bank 21D contains periodic groups of radiation stripes (H, J, L), which are oriented along the y-axis.

Although the embodiment depicted in FIG. 5 indicates that the radiation banks (21A, 21B, 21C and 21D) are divided into three spatially periodic groups of radiation stripes and that each individual radiation stripe is made up of a plurality of RED's 11, these are not general requirements. In general, the radiation banks (21A, 21B, 21C and 21D) can be comprised of any number of groups of radiation stripes and the individual radiation stripes may incorporate any radiation source. In order to effect a Moiré type absolute position encoder, however, the geometry of the radiation stripes are required to meet the size and periodicity criteria, which are explained further below. The use of individual RED's 11 to form the radiation stripes helps to minimize the switch's size by accommodating both the control signal RED's 11 and the switching units 22 on the same chassis 16. In other implementations, such as the one depicted in FIG. 3, where space is not such a critical issue, other easily shaped radiation sources, such as liquid crystal light valves illuminated by a conventional light source, may be used to implement the various groups of radiation stripes (A through L).

Figure 6:
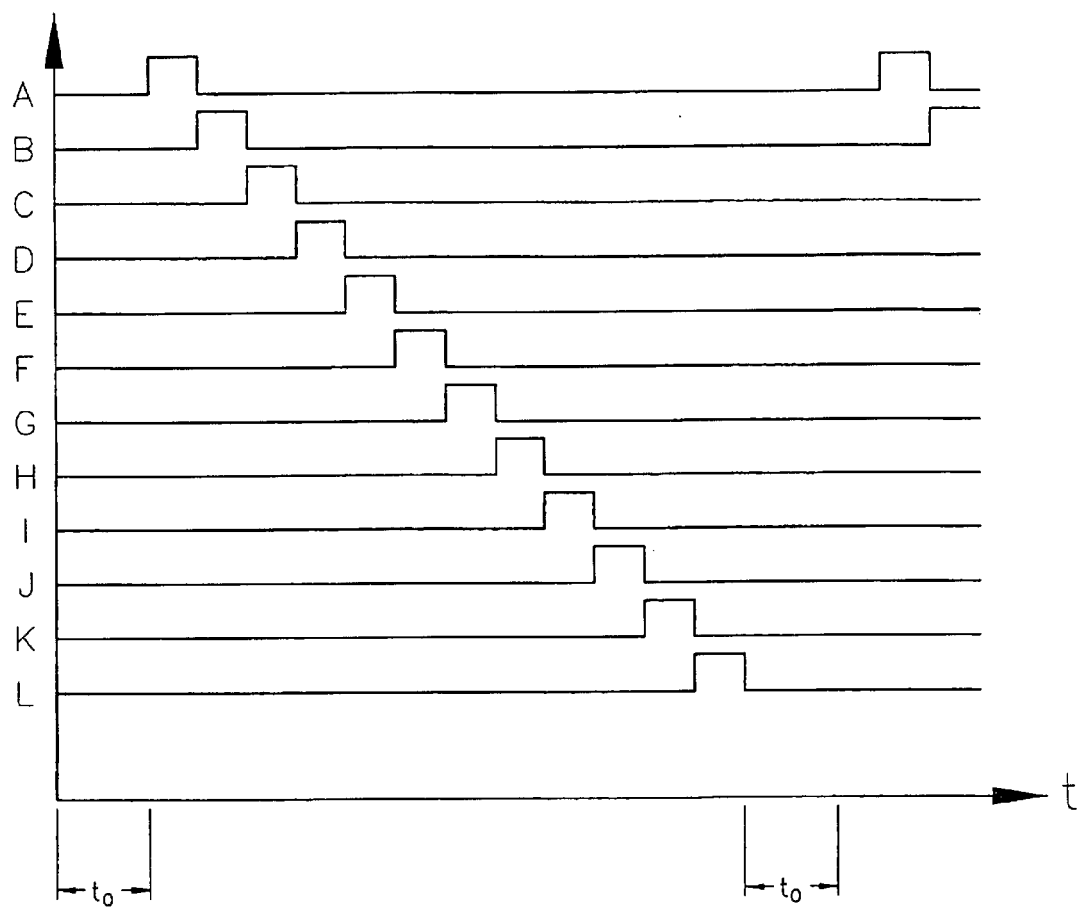
FIG. 6 shows a timing diagram indicating the time division multiplexing of the control signal pulses from the various phases.

For the purposes of generating the control signals used by the fiber position measurement system, all of the individual RED's 11 within a particular group of radiation stripes (A through L) are pulsed at the same time. For reasons that will be apparent from the explanation below, the signals (A through L) from the pulsing of the various groups of radiation stripes (A through L) are often referred to in this disclosure as "phases" (A through L). The pulsing sequence of phases (A through L) is depicted in FIG. 6. In the preferred embodiment, the pulses of the control signal RED's 11 that form the radiation stripes (A through L) are multiplexed in time. The control of the timing of the pulses (A through L) is dictated by a central electronic clock signal, which is available at both "sides" of the switch. Thus, when the intensity of the control signal pulses (A through L) is measured at the other "side" of the switch, the intensity of the individual pulses (A through L) can be distinguished from one another.

After each phase (A through L) is pulsed once, there is a period of time $t_o$ where no control signals are pulsed. As will be explained further below, this period of time $t_o$ is used by the alignment control system to help normalize the measured intensity of the radiation control signals (A through L) by measuring the ambient radiation level present in the switch. It should be noted that throughout this disclosure, the letters (A through L) are used at various times to designate: (1) the groups of radiation stripes (A through L); (2) the optical control signals (A through L) that are associated with those radiation stripes; and (3) electronic control signals (A through L), which are measured at the other "side" of the switch in response to each optical control signal (see the description below).

3. The Switching Unit and Control System

Figure 7:
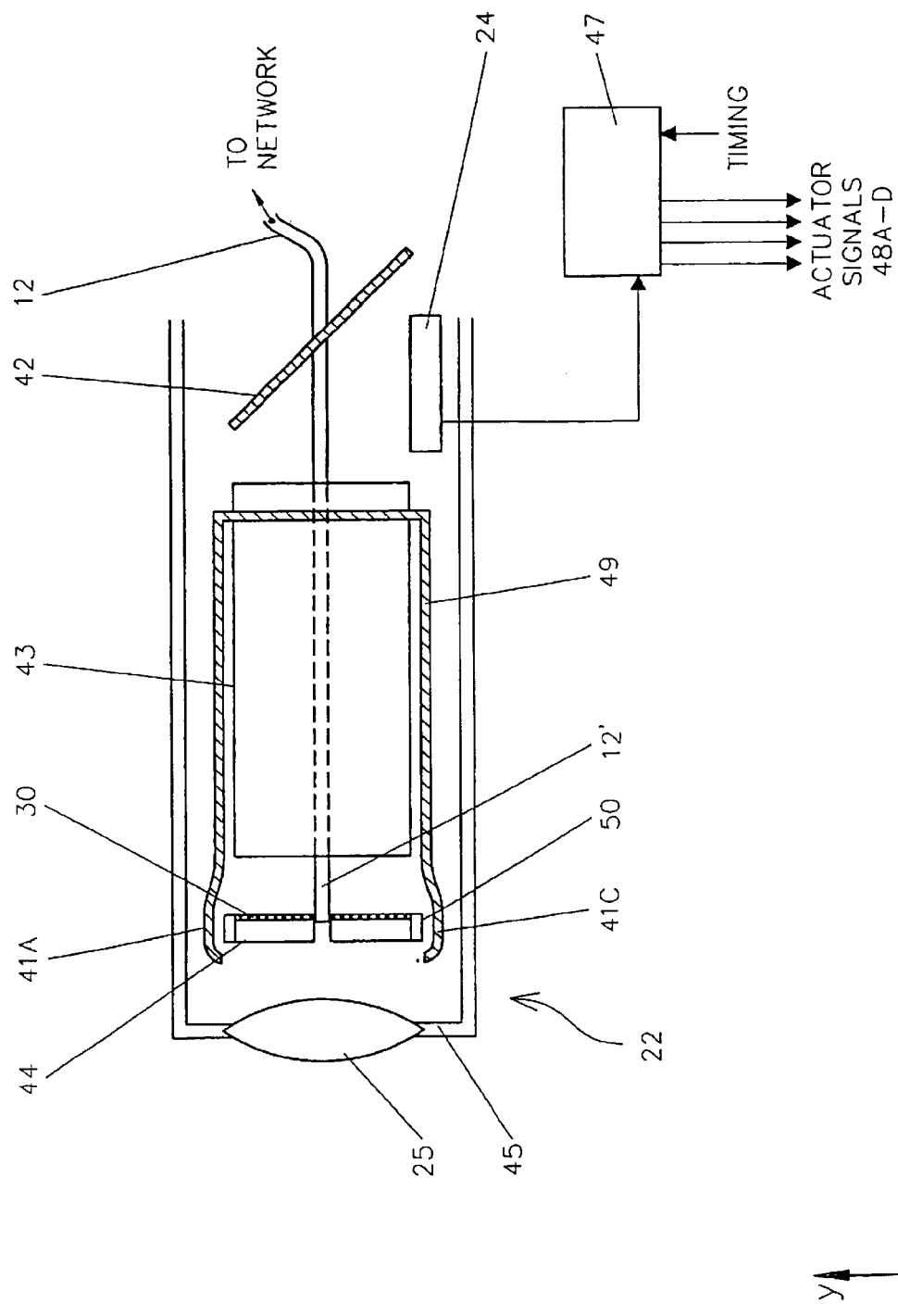
FIG. 7 depicts a schematic diagram of an embodiment of a switching unit in accordance with the invention.

FIG. 7 schematically depicts the cross-section of an embodiment of an individual switching unit 22 in accordance with the present invention. The components of the switching unit 22 are mounted inside of a carriage assembly 45. In the case of a switching unit 22 with a fiber 12 that is receiving communication signals, lens 25 is operative to receive both communication signals and control signals (A through L) from the groups of radiation stripes (A through L) on the other "side" of the switch. In typical operation, the lens 25 receives communication signals ($\lambda=1310$ nm and $\lambda=1550$ nm) from the other "side" of the switch and focuses the communication signal on the fiber end 12'. Where the switching unit 22 has a fiber 12 that is transmitting communication signals, the lens 25 remains operative to receive control signals (A through L) from the other "side", but is also operative to focus outgoing communication signals from the fiber end 12'.

FIG. 18 is a schematic depiction of the transmission of a communication signal beam across the switch interface. In order to reduce optical losses, it is preferable (but not necessary) that the communication signal be a focused beam (as opposed to a collimated beam susceptible to divergence). To simplify the discussion, extraneous elements, such as bending mirrors and other switching unit elements are omitted from FIG. 18. As depicted in FIG. 18A, communication signals from the end 400 of the first side fiber 402 are focused by lens 25 forming a beam 405, which has a "waist" in the switch interface cavity and which is imaged substantially onto the surface of the second side lens 25'. The second side lens 25' receives the communication signal beam 405 and distributes it across the end 408 of the second side fiber 410. In a similar manner, a focused communication signal beam 407 may be transmitted from the second side fiber 410 to the first side fiber 402 as depicted in FIG. 18B.

Referring back to FIG. 7, lens 25 may generally be any combination of optical elements that achieves the functional goals described herein. The remaining description of FIG. 7 assumes that the switching unit 22 receives communication signals. It will be appreciated that the discussion also applies to transmitting switching units 22, except that the communication signals are transmitted from the fiber 12 through the lens 25 rather than received.

In addition to focusing communication signals, lens 25 also focuses control signals (A through L) in such a manner as to project an image of the radiation banks (21A, 21B, 21C and 21D) from the other side of the switch, through transparent disk 44 and onto the surface of reticle 30. The portion of the radiation from control signals (A through L) that is transmitted through reticle 30 is then collected by light pipe 43, which internally reflects the radiation as it is directed through the light pipe 43 towards mirror 42. Mirror 42 reflects the control signal radiation towards photodetector 24, which measures the intensity of the radiation and delivers an electronic signal to controller 47. Transparent disk 44, light pipe 43 and mirror 42 are not fundamental to the invention. In general, the invention should be understood to incorporate any optical means of collecting the radiation transmitted through reticle 30 and directing it towards photodetector 24.

As mentioned above, controller 47 receives timing information from a single system clock (not shown). Using this timing information and the electronic signals from photodetector 24, controller 47 is able to separately detect the fraction of the intensity of each control signal (A through L) that is transmitted through reticle 30. Any reference to a "controller" in this disclosure should be understood to embody any processor capable of providing the functionality described herein and includes, without limitation, anything in the range between microprocessors forming part of an embedded system and dedicated computers.

During typical switch operation, the controller 47 will receive an externally generated network command that the particular switching unit 22 is to be configured to receive communication signals from another switching unit 22 on the opposite "side" of the switch. In order to optimise the reception of such communication signals, the fiber end 12' must be moved on two dimensions until it reaches a "target position", where the insertion of the communication signal into fiber end 12' is maximized. The two dimensions of movement of the fiber end 12' are on the plane substantially perpendicular to the page of FIG. 7. As will be explained below, the control signals (A through L) together with the reticle 30, the photodetector 24 and the controller 47 constitute a Moiré-type position encoder integral to the fiber position measurement system. The fiber position measurement system determines the "actual position" of the reticle 30 (and hence the fiber end 12'). Prior to receiving the externally generated network command, the fiber 12 will be out of alignment (i.e. the actual position of the fiber end 12' will be different than the target position). Using the target position of the fiber end 12' (associated with the network switching command) and the current and previous encoder measurements of the actual position of the fiber end 12', the controller 47 uses well-known techniques of control theory to generate actuator signals (48A, 48B, 48C and 48D). Depending on timing requirements and controller resources, the control system may cause the actuation system to run "open loop" for an initial period during large jumps (i.e. where the target position is significantly different than the actual position). In open loop mode, the position measurement system is not functioning and the actuator signals (48A, 48B, 48C and 48D) are set at a level independent of the actual position of the fiber end 12'.

After a brief period of open loop operation, the position measurement system is reactivated and the control system resumes control of the actuator signals (48A, 48B, 48C and 48D). As will be explained below, an actuation system receives the actuator signals (48A, 48B, 48C and 48D) and causes the fiber end 12' to move in such a manner that the actual position of the fiber end 12' approaches the target position. When the actual position of the fiber end 12' reaches the target position, the control system is said to be "servo-locked" on the target position, because any small deviations of the actual position from the target position are quickly rectified by the control system.

Although the above discussion describes the basic control system from the perspective of a particular switching unit 22, it should be appreciated that control of the transmitting and receiving fiber ends occurs simultaneously in the associated switching units 22 on both "sides" of the switch. That is, the control system in the transmitting switching unit is controlling the position of its fiber end to optimise the direction of the transmission of communication signals to a particular receiving switching unit on the other "side" of the switch. Simultaneously, the receiving switching unit is controlling the position of its fiber end to optimise the direction of reception of the communication signal from a particular transmitting switching unit on the other "side" of the switch. For this reason, the control system disclosed herein may be said to be a "two-sided" control system as opposed to some of "one-sided" prior art control systems. A two-sided control system has the advantage (described above) of increasing the effective NA of the receiving fibers. In addition, having two-sided control is effective to remedy small movements and vibrations of the components on either side of the switch.

4. Actuation System

In a preferred embodiment of the invention shown in FIG. 7, the actuator system 49 employs magnetic energy to move the fiber end 12' over the two-dimensional surface spanned by the plane perpendicular to the page. The actuator signals (48A, 48B, 48C and 48D) magnetically polarize the actuator branches (41A and 41C) by passing electrical current though metal windings (not shown) that are wrapped around the branches (41A and 41C). It should be noted here that there are actually four actuator branches (41A, 41B, 41C and 41D), but only two of them are visible in FIG. 7. In a preferred embodiment, the branches are made of a ferrite material (such as an alloy made of nickel and iron), but this is not a requirement of the invention. The polarization of the branches (41A, 41B, 41C and 41D) causes the metal ring 50, located on the outside of transparent disk 44, to move on the two-dimensional surface, effecting a corresponding movement of the fiber end 12'. In the preferred embodiment the metal ring is also composed of a ferrite material which again could be an alloy of nickel and iron although there are other materials that could also be used. In accordance with the present invention, the control system selects the actuator signals (48A, 48B, 48C and 48D) and, hence, determines the movement of the fiber end 12', so as to make the actual position of the fiber end 12' approach the target position.

Figure 8:
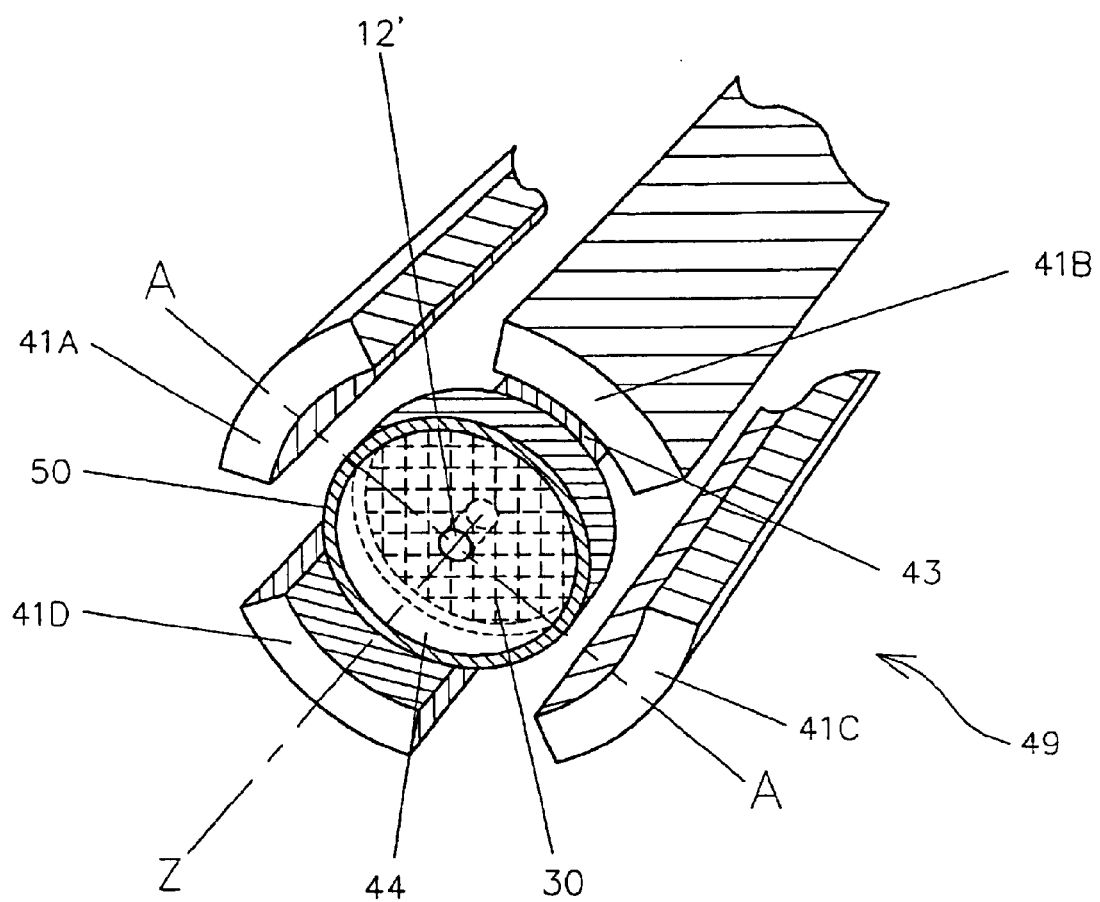
FIG. 8 represents a schematic diagram of the magnetic actuation system disclosed by the present invention.

The functionality of the actuator system 49 will be better appreciated with simultaneous reference to FIGS. 7, 8 and 9. FIG. 8 depicts a perspective view of the actuation system 49. For ease of reference and discussion, the components of the switching unit 22 not related to the actuation system are not shown in FIG. 8. FIG. 7 depicts a cross-sectional view of the switching unit along the line A—A (see FIG. 8). FIGS. 7 and 8 depict the four actuator branches (41A, 41B, 41C and 41D) surrounding the metal ring 50, which houses the reticle 30, the transparent disk 44 and the fiber end 12'. Advantageously, the reticle 30 is located behind the transparent disk 44 to minimize deflection of the control signals, which may be inadvertently caused by bending of the fiber 12 about the center of mass. The actuator branches (41A, 41B, 41C and 41D) are positioned so as to be substantially centred between the x and y axes. That is, the center of each actuator branch (41A, 41B, 41C and 41D) is located at approximately 45 degrees between the x and y axes.

Not shown in FIG. 7 or 8 are the coils of wire that are wrapped around each of the actuator branches (41A, 41B, 41C and 41D). These coils combined with the actuator signals (48A, 48B, 48C and 48D) described above are operative to polarize the actuator branches (41A, 41B, 41C and 41D). The polarization of the actuator branches is most easily understood by referring to FIGS. 9A and 9B, which schematically depict a portion of the actuator branches 41A and 41B with their respective coils 46A and 46B wrapped around them. Actuator signal 48A controls the amplitude of current source $I_A$ and, similarly, actuator signal 48B controls the amplitude of current source $I_B$. When current passes through the coil 46A, a magnetic field is generated and the actuator branch 41A is polarized. It will be appreciated that the active end 41A' of actuator branch 41A will acquire a magnetic north polarization. Similarly, when current passes through the coil 46B, a magnetic field is generated and the actuator branch 41B is polarized and the active end 41B' of actuator branch 41B will acquire a magnetic south polarization. The strength of the magnetic fields associated with the polarization of the active ends 41A' and 41B' of the actuator branches 41A and 41B is controlled by the amount of current that flows though the coils 46A and 46B, which is turn controlled by the actuator signals 48A and 48B.

Being able to individually polarize the actuator branches (41A, 41B, 41C and 41D) and to control the strength of the polarization is instrumental in effecting the movement of the fiber end 12' on the surface spanned by the two dimensions (x and y). Referring to FIG. 10, each of FIGS. 10A through 10D show a plan view of the end of the switching unit 22, which depicts the metal ring 50 and the actuator branches (41A, 41B, 41C and 41D). FIG. 10A shows how the actuator branches 41A and 41B are polarized to effect a movement of the ring 50 in the positive direction on the y-axis (indicated by arrow 52). Actuator branch 41A is polarized to be a north magnetic pole and actuator branch 41B is polarized to be a south magnetic pole. In a manner similar to that of a conventional horseshoe magnet, the polarization of actuator branches 41A and 41B creates a magnetic flux (indicated by arrows 51 in FIG. 10), which causes the metal ring 50 (and hence the fiber end (not shown in FIG. 10)) to be drawn in the positive direction on the y-axis indicated by arrow 52. FIG. 10B shows how the actuator branches 41B and 41C are polarized to effect a movement of the ring 50 in the positive direction on the x-axis, by polarizing branches 41B and 41C to be south and north magnetic poles respectively. This polarization creates force, which pulls the metal ring 50 and the fiber end in the positive x direction indicated by arrow 52. FIG. 10C shows branch 41A with a north polarization and branch 41D with a south polarization, so as to force ring 50 in the negative direction on the x-axis. Finally, FIG. 10D shows branch 41C with a north polarization and branch 41D with a south polarization, so as to force ring 50 in the negative direction on the y-axis. It will be appreciated that using linear combinations of the above described configurations, the actuator system 49 can move the ring 50 and the fiber end in any direction on the two-dimensional plane of the x and y axes in response to the actuator signals (48A, 48B, 48C and 48D) from the alignment control system.

The physical design of the actuation system (particularly the magnetizable ring 50 and the actuator branches (41A, 41B, 41C and 41D)) overcomes some of the difficulties associated with a magnetic based fiber bending actuation system. In particular, the design is implemented to maximize the transverse magnetic flux, and corresponding force, experienced by the ring 50 (i.e. in the two-dimensional plane spanned by the x and y axes), while minimizing forces that tend to tilt or rotate the ring 50 and cross-talk between actuation systems in adjacent switching units 22.

Because of the desire to minimize the lateral dimensions of the switching unit 22, the actuator branches (41A, 41B, 41C and 41D) are situated quite close to one another. Accordingly, there is a tendency for magnetic flux to jump directly between two polarized branches. For example, in FIG. 10-A, it is desired for the magnetic flux (indicated by arrows) to emanate from actuator branch 41A through ring 50 and into actuator branch 41B. Flux lines that jump directly from branch 41A to branch 41B represent parasitic losses of power, because they do not contribute to the movement of the ring 50 or the fiber end 12'. To minimize the parasitic loss of flux, the actuator branches (41A, 41B, 41C and 41D) are designed to be as short as possible, as far apart as possible and to have an optimal surface curvature, while still capable of being polarized at or near the magnetic saturation of the branch material. In addition, the ring 50 is designed to be as wide as possible along the z-axis (see FIG. 8), so as to maximize the surface area capable of receiving magnetic flux. Maximizing the magnetic flux and corresponding force in this manner helps to minimize the switching time for a given rate of power consumption.

Other advantageous features of the actuation system in the present invention include the "cup" shaped curvature of the actuator branches (41A, 41B, 41C and 41D) and the cylindrical shape of the ring 50. These design features help to minimize the torques that tend to cause second order bending of the fiber 12 and tend to rotate the ring 50 (i.e. about the z axis). The cup shape of the branches (41A, 41B, 41C and 41D) depicted in FIGS. 7 and 8 helps to create a force on the ring 50 that has no appreciable components oriented along the z-axis. In this manner, the fiber 12 is prevented from second order bending (i.e. in an "S-shaped" mode).

The cylindrical shape of ring 50 ensures that there is circumferential symmetry and that there are no torques that might cause the ring to rotate about the z-axis. Adjustments can also be made to the length of the actuator branches (41A, 41B, 41C and 41D) and the corresponding length of the bare fiber 12 to compensate for the possibility of mechanical resonance.

In accordance with the preferred embodiments described herein, the implementation of the optical switch using the magnetic actuation system 49 disclosed above has several advantages over prior art switching systems, which are based largely on motorized or piezoelectric actuation techniques. As discussed above, the size of the switch is minimized by disassociating the control signal RED's 11 from the switching units 22. In this manner, the two dimensional range of the spatial movements required by the actuation system for the ring 50 and the fiber end 12' are relatively small. For this reason, the actuation system 49 can be run with reduced power consumption and the switching times are minimized. In addition, the magnetic actuation system 49 described above can be operated with extreme precision, because it does not suffer from motor back-lash and does not require any special implements or gears to manage the micro-movements of the fiber end 12'. Other advantages of the magnetic actuation system include minimal hysteresis effects and relatively low voltages required for operation, which make the system easier to implement in conventional optical networks than a comparable piezoelectric actuation system. Finally, the magnetic actuation system disclosed herein is made with inexpensive components, making it significantly cheaper than using micro-machined actuation techniques.

Despite magnetic actuation of the fiber end being the preferred embodiment for aligning the optical path of the communication signals, it is not the only possible embodiment. The alignment control system envisaged by this invention can be implemented using other means of actuating the fiber ends, such as piezoelectric, mechanical or micro-mechanical means. Alternatively, the alignment control system envisaged by this invention may be implemented by inserting moveable optical elements, such as micro-electro-mechanical system (MEMS) mirrors into the path of the communication signal and controlling the optical path of the communication signal between fibers.

5. Fiber Position Measurement System

As discussed above, the alignment control system of the present invention is used by each of the switching units 22 associated with both the receiving fibers and the transmitting fibers. Referring to FIG. 7, within a particular switching unit 22, alignment control involves multiple steps to generate the actuator signals (48A, 48B, 48C and 48D). The first step involves receiving a network command to connect a fiber 12 in that particular switching unit 22 to a fiber (not shown) on the other "side" of the switch. Upon receipt of this command, the controller (not shown) selects a "target position" for the particular fiber end 12'. The second step entails calculating the actual position of the particular fiber end 12'. Finally, the third step relates to using well-known control theory techniques to calculate the required actuator signals (48A, 48B, 48C and 48D) to move the fiber end 12' from its actual position to its target position.

The preferred embodiment of the present invention employs a two-dimensional Moiré type absolute position encoder to determine the actual position of the fiber end 12' in each switching unit 22. The switching unit 22 employs a reticle 30, which is fitted circumferentially around the outside of the fiber 12 and the inside of the ring 50. As discussed above, the lens 25 is operative to focus the control signals (A through L), projecting an image of the radiation banks (21A, 21B, 21C and 21D) from the opposite side of the switch through the transparent disk 44 and onto the surface of the reticle 30. It will be appreciated that the fiber end 12' is inserted into the aperture in the center of the reticle 30 and, as such, a system that determines the position of the reticle 30 actually determines the position of the fiber end 12'.

5.1 The Reticle

Figure 11:
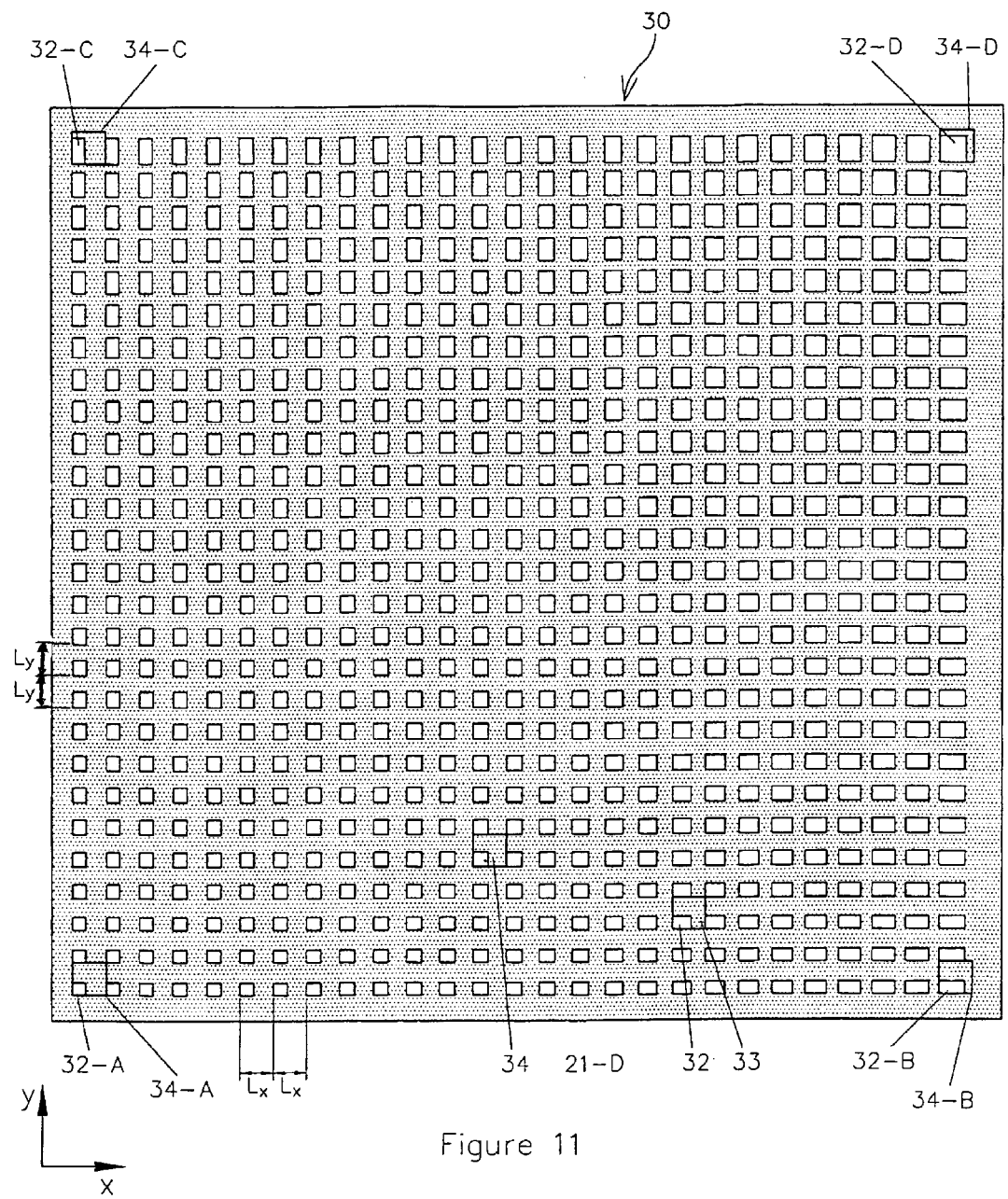
FIG. 11 depicts a specialized reticle in accordance with the preferred embodiment of the two dimensional encoder disclosed by the present invention. The reticle has a constant pitch on two dimensions, but has an aperture duty cycle that varies on both the x and y dimensions.

FIG. 11 depicts a preferred embodiment of the specialized reticle 30 in accordance with the present invention, which helps to provide absolute positional information about the location of the fiber end 12'. The reticle 30 is a two-dimensional reticle with axes labelled x and y. Each cell 34 of the reticle 30 has two distinct regions, a transparent aperture 32 and an opaque or non-transmissive region 33. In addition, all of the cells 34 of the reticle 30 have a length $L_x$ on the x-axis (referred to herein as the pitch in the x direction) and a length $L_y$ on the y-axis (referred to herein as the pitch in the y direction). The reticle 30 is fabricated such that the cellular pitches $L_x$ and $L_y$ in each dimension are constant for every cell 34 in the reticle 30. Despite the constant pitches $L_x$ and $L_y$, the aperture duty cycle of the reticle 30 varies along each of the x and y axes. Throughout this disclosure, the phrase "aperture duty cycle" should be understood to refer to the fraction of the area $(A=L_xL_y)$ of a cell 34 occupied by the aperture 32. This variation of the aperture duty cycle can be observed from FIG. 11, where cell 34-A can be seen to have a significantly lower aperture 32-A and a lower aperture duty cycle than that of cell 34-D.

As will be explained further below, the variation in aperture duty cycle of the cells in the reticle 30 permits the position measurement system to calculate absolute positional information about the fiber end 12'. In the preferred embodiment, the constant pitches $L_x$ and $L_y$ are both equal for ease of calculation, but this is not a requirement and the pitch of both dimensions may be different from one another, provided that they are both constant.

The system for determining the absolute position disclosed herein involves two interrelated procedures. The first step relates to measuring the position of the reticle 30 to within the area of a particular cell and is referred to throughout this disclosure as determining the "coarse position". The second step relates to measuring the precise position of the reticle 30 within the known cell and is referred to throughout this disclosure as determining the "fine position".

Figure 12:
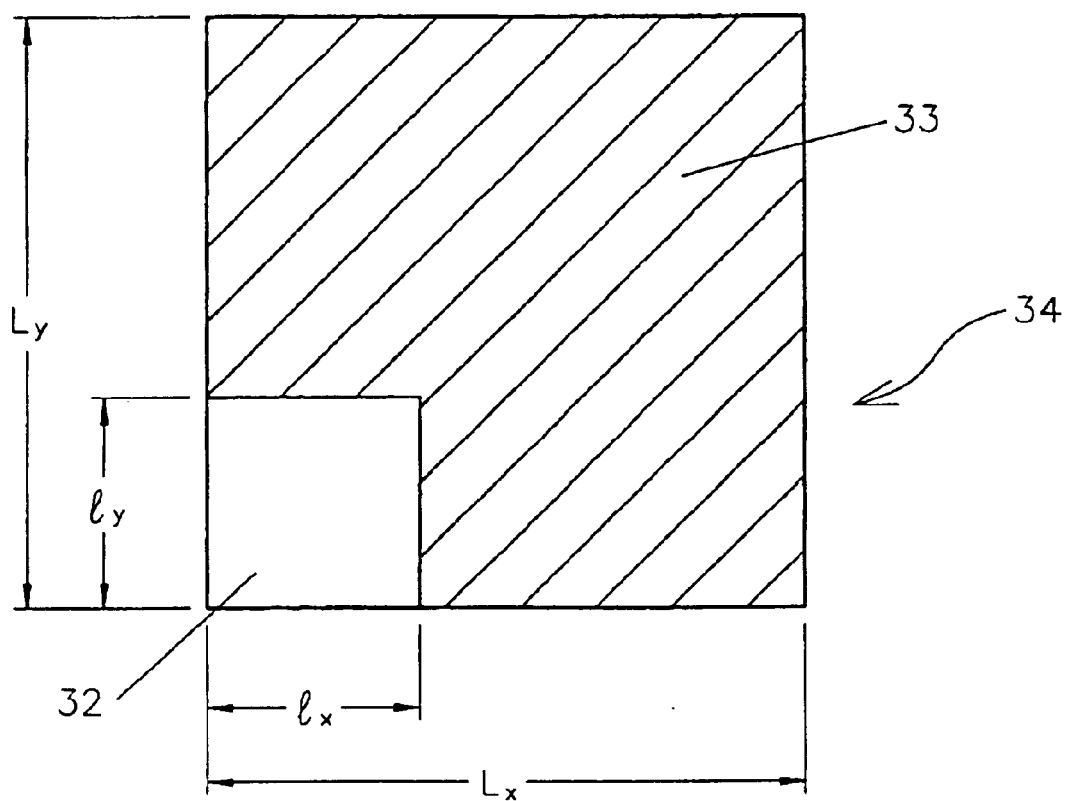
FIG. 12 is a magnified diagram of a single cell in the reticle of FIG. 13, displaying the dimensions of the aperture and the dimensions of the cell.

FIG. 12 depicts a single cell 34 of the reticle 30 in more particular detail. The pitches of the cell 34 in the x and y dimensions are $L_x$ and $L_y$ respectively and the cell 34 has an aperture 32 dimensioned $l_x$ by $l_y$. The opaque area 33 occupies the remainder of the cell 34. It should be noted that, for ease of discussion, FIG. 12 arbitrarily displays a cell 34 with the aperture 32 in the bottom left hand corner. It will be appreciated that this choice of cellular construction is not unique and that other cellular constructions can be envisaged, which have the properties of constant pitch and variable aperture duty cycle.

As mentioned above, the aperture duty cycle, defined by equation (1), varies throughout the reticle 30:

$$\text{aperture duty cycle} = (l_x l_y)/(L_x L_y) \qquad (1)$$

Referring simultaneously to FIG. 11 and FIG. 12, the four corner cells (34-A, 34-B, 34-C and 34-D) of the reticle 30 are labelled to demonstrate the variation of the aperture duty cycle. In cell 34-A, the aperture 32-A is dimensioned such that $l_x=(\frac{1}{3})L_x$ and $l_y=(\frac{1}{3})L_y$, yielding an aperture duty cycle of ⅓. For the preferred embodiment, the aperture dimension $l_x$ is allowed to vary linearly along the x-axis of the reticle 30 from $l_x=(⅓)L_x$ in cell 34-A to $l_x=(⅔)L_x$ in cell 34-B. As a result, cell 34-B has an aperture duty cycle equal to ⅔. Similarly, the dimension $l_y$ in the preferred embodiment varies linearly from $l_y=(⅓)L_y$ in cell 34-A to $l_y=(⅔)L_y$ in cell 34-C, yielding an aperture duty cycle of ⅔ in cell 34-C. Finally, in cell 34-D, $l_x=(⅔)L_x$ and $l_y=(⅔)L_y$, for an aperture duty cycle of 4/9.

In accordance with a preferred embodiment of the reticle 30 depicted in FIGS. 8 and 9, the pitch of the cells is equal in both dimensions (i.e. $L_x=L_y=L$) and the aperture dimensions $l_x$ and $l_y$ vary in accordance with equations (2) and (3):

$$l_x = L/3 + n_x L/(3N_x) \quad n_x = 0, 1, 2, \ldots N_x \quad (2)$$

$$l_y = L/3 + n_y L/(3N_y) \quad n_y = 0, 1, 2, \ldots N_y \quad (3)$$

where $N_x$ and $N_y$ equal the total number of cells in the x and y dimensions of reticle 30 and $n_x$ and $n_y$ are integer indices of the cell number in the x and y dimensions respectively. It will be appreciated that the indices $n_x$ and $n_y$ uniquely identify a particular cell 34 within the reticle 30. That is, knowledge of the indices $n_x$ and $n_y$ represents the coarse position of the reticle 30 and the associated fiber end 12'.

Although the variation of the aperture dimensions $l_x$ and $l_y$ in the preferred embodiment of the invention is described by equations (2) and (3), adherence to these equations is not a requirement. In general, all that is required by the invention to determine the absolute position of the fiber end 12', is that there is a known relationship between the dimension $l_x$ and the index $n_x$ and the dimension $l_y$ and the index $n_y$, so that knowledge of the aperture duty cycle described by equation (1) can be used to calculate the indices $n_x$ and $n_y$. Despite the generality of the required relationships between the dimensions $l_x$ and $l_y$ and the indices $n_x$ and $n_y$, the simple relationships of the preferred embodiment described by equations (1), (2) and (3) facilitate easy calculation of the coarse position as will be described below.

It should be appreciated that the above described embodiment of the reticle 30 having a variable aperture duty cycle is useful for determining the absolute position of the fiber end. However, a reticle having both constant pitch and constant aperture duty cycle can be used to implement a position measurement system that discerns the relative position of the fiber end 12' (i.e. relative to some reference position). The invention should be understood to incorporate such embodiments.

Although the reticle 30 described above represents a particular embodiment of the present invention, there are other embodiments used in particular circumstances, that may prove to be advantageous. Such embodiments are described further below and should be understood to form part of the present invention.

5.2 Radiation Banks, Radiation Stripes and Phase Signals

Figure 13:
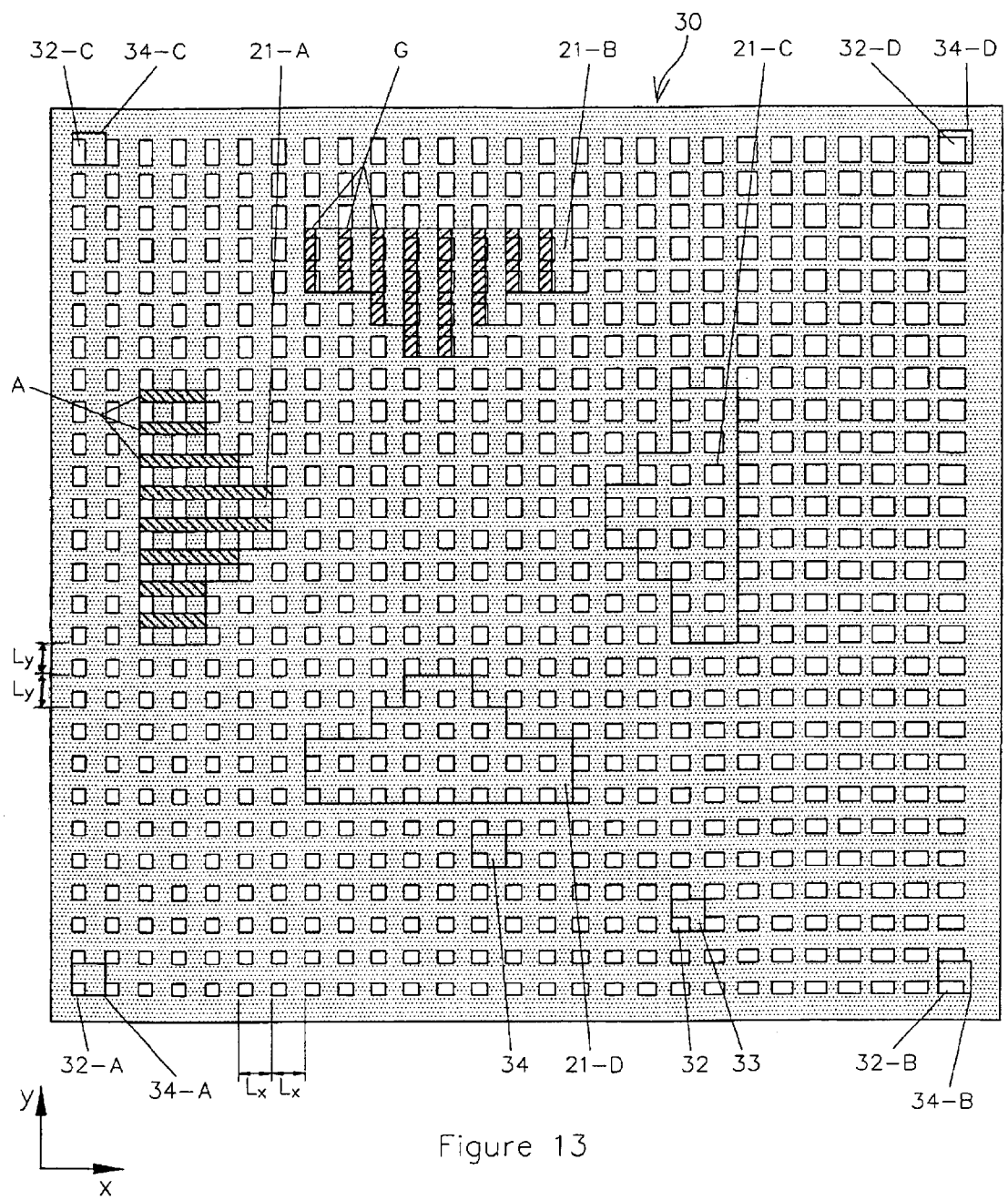
FIG. 13 depicts the image of the radiation banks as projected onto the reticle in accordance with the present invention. The images associated with two groups of radiation stripes (i.e. two phase) are shown shaded.

Referring simultaneously to FIG. 5, FIG. 7 and FIG. 13, lens 25 projects the image of the radiation from the radiation banks (21-A, 21-B, 21-C and 21-D) onto the reticle 30. FIG. 13 depicts an outline of the images of the radiation banks (21-A, 21-B, 21-C and 21-D) on the surface of the reticle 30 after they are imaged by lens 25. The images of a particular phase (A through L) within a radiation bank (21-A, 21-B, 21-C and 21-D) creates a spatially periodic pattern on the reticle 30, which corresponds to the spatially periodic group of radiation stripes from which it is comprised. As discussed above, various groups of radiation stripes (i.e. phases (A through L)) are pulsed together, and this pulsing of phases (A through L) is multiplexed in time. As a result, only the image of one of the phases (A through L) is ever present on the reticle 30 at any given time. However, for the purposes of explanation, FIG. 13 depicts the spatially periodic images of phase A from radiation bank 21-A, phase G from radiation bank 21-B (shown shaded in FIG. 13) and the outlines of the images of the various radiation banks (21-A, 21-B, 21-C and 21-D) on the surface of the reticle 30 at the same time. As the fiber end 12' moves in two dimensions with respect to the radiation banks (21-A, 21-B, 21-C and 21-D), the reticle 30 also moves. Consequently, the positioning of the images of the radiation banks (21-A, 21-B, 21-C and 21-D) depicted in FIG. 13 would move with respect to the reticle 30.

In accordance with the preferred embodiment of the present invention, the geometry and grouping of the radiation stripes (i.e. into phases (A through L)), the optical path length between the two "sides" of the switch and the optical system 25 are selected to achieve a number of criteria, including both size criteria and periodicity criteria. The image of an individual radiation stripe on the reticle 30 is rectangular in shape and has two axes, one elongated axis and one short axis. Radiation banks 21-A and 21-C are made up of groups radiation stripes (i.e. phases A through F), which have their elongated axes oriented substantially parallel to the x-axis and radiation banks 21-B and 21-D have groups of radiation stripes (i.e. phases G through L), which have their elongated axes oriented substantially parallel to the y-axis. In this disclosure, a radiation stripe is said to be "oriented" along a particular axis if its elongated dimension is substantially parallel to that axis.

In the preferred embodiment of the invention, there are three phases in each radiation bank (21-A, 21-B, 21-C and 21-D). The size of the radiation stripes and the optics 25 of the preferred embodiment are selected such that the image of a particular radiation stripe on the reticle 30 has an elongated axis that is equal to an integral number of cellular pitches and a short axis equal to ⅓ of a cellular pitch. For example, the images of radiation stripes in the phases oriented along the x-axis (i.e. phases A through F) have a length in the x-dimension equal to an integral number of pitches LX and a length in the y-dimension equal to ⅓$L_y$. Similarly, the images of radiation stripes in the phases oriented along the y-axis (i.e. phases G through L) have a length in the y-dimension equal to an integral number of pitches $L_y$ and a length in the x-dimension equal to ⅓$L_x$. In this manner, if three immediately adjacent radiation stripes in the same radiation bank were imaged onto the reticle 30, they would occupy an area with dimensions equal to one cellular pitch on their short axis and an integral number of pitches on their long axis. For example, if three immediately adjacent radiation stripes in groups A, C and E were pulsed simultaneously, then their images on the reticle 30 would occupy an area with dimensions $L_y$ on the y-axis and an integral number of pitches $L_x$ on the x-axis. Similarly, if three immediately adjacent radiation stripes in groups G, I and K were pulsed simultaneously, then their images on the reticle 30 would occupy an area with dimensions $L_x$ on the x-axis and an integral number of pitches $L_y$ on the y-axis. It will be appreciated from these size criteria, that if an entire radiation bank (21-A, 21-B, 21-C or 21-D) was imaged at once, it would occupy an area on the reticle 30 equal to that of an integral number of cells.

In addition to the size criteria set out above, the images of the phases (A through L) in the preferred embodiment have certain periodicity criteria. As depicted by the image of phase A on the reticle 30 in FIG. 13, the images of phases oriented along the x-axis (A through F) are periodic along the y-axis with a spatial period equal to the cellular pitch $L_y$ of the reticle 30. Similarly, as depicted by the image of phase G in FIG. 13, the images of the phases oriented along the y-axis (G through L) are periodic along the x-axis with a spatial period equal to the cellular pitch $L_x$ of the reticle 30. As a consequence of these periodicity criteria, the image of the individual radiation stripes on the surface of the reticle 30 within a particular phase (A through L) occupies the same spatial phase in adjacent cells. For example, FIG. 13 shows that the individual radiation stripes in the image of phase A occupy the same spatial phase (i.e. y-position) within neighbouring rows of cells. Similarly, the individual radiation stripes in phase G occupy the same spatial phase (i.e. x-position) within adjacent columns of cells. This periodicity criteria results in a spatial phase relationship, which is the reason that the signals from the various groups of radiation stripes (A through L) are referred to as "phases" (A through L). In addition, the projection of the spatially periodic phases (A through L) onto the reticle 30 creates a Moiré effect similar to that created by projecting light through two back to back reticles as is common in conventional Moiré type encoders.

Although the preferred embodiment discloses radiation banks having three groups of radiation stripes (i.e. three phases) in each radiation bank (21-A, 21-B, 21-C or 21-D), the number of phases in each radiation bank is not limited to three. The invention should be understood to incorporate schemes having different numbers of phases in each radiation bank (21-A, 21-B, 21-C or 21-D), provided that the images of the radiation stripes meet the size and periodicity criteria outlined above. In addition, the individual radiation stripes need not be comprised of RED's. Generally, any light source that can be shaped into a geometry able to approximate the size and periodicity criteria discussed in this disclosure may be used to form the radiation stripes and the radiation banks.

Referring back to FIG. 7, any radiation from phases (A through L) that is transmitted through the reticle 30 is collected by light pipe 43 and directed (via mirror 42) onto photodetector 24, which produces electronic signals in proportion to the intensity of the transmitted radiation. In accordance with the preferred embodiment of the invention, the photodetector is a conventional Si photodetector, which is sensitive to all radiation having the wavelength of the control signals (i.e. $\lambda=940$ nm) that is incident on its surface. The use of an Si photodetector is advantageous, because it is not sensitive to the larger wavelength communication signal radiation ($\lambda=1310$ nm and $\lambda=1550$ nm). It will be appreciated that the use of such a simple photodetector has many advantages over the more complex and expensive CCD and quadrature photodetectors taught by the prior art switches.

A controller (not shown) uses timing information to de-multiplex the signals and uniquely determine the radiation intensity for the individual phases (A through L). The controller samples the electronic intensity from each phase (A through L) and uses the sampled signals to calculate the position of the reticle 30 as described below.

Although advantageous, the embodiment depicted in FIG. 7 is not unique. There are many embodiments capable of measuring the individual radiation signals from each phase (A through L). For example, the technique of the preferred embodiment involves multiplexing the phases (A through L) in time and then measuring them using a single photodetector. However, an alternative embodiment involves continuously active radiation signals from each radiation bank (21-A, 21-B, 21-C or 21-D) or each phase (A through L) and a plurality of photodetectors, each photodetector shaped and aligned, so as to only receive signals from a particular radiation bank (21-A, 21-B, 21-C or 21-D) or a particular phase (A through L). Another alternative embodiment involves using different wavelengths of radiation for each phase (A through L) and having distinct wavelength sensitive photodetectors or band pass filters corresponding to each phase (A through L). The invention should be understood to incorporate any means of uniquely measuring the radiation signals from each phase (A through L). It will be appreciated, however, that the preferred embodiment using time division multiplexing of phases (A through L) and a single photodetector has the inherent advantage of being able to be produced with relatively inexpensive "off the shelf" type components.

Although the radiation banks (21-A, 21-B, 21-C and 21-D) described above represent a particular embodiment of the present invention, there are other embodiments used in particular circumstances that may prove to be advantageous. Such embodiments are described further below and should be understood to form part of the present invention.

5.3 Phase Normalization

Prior to using the measured intensity of the various phases (A through L) to calculate the position of the reticle 30, the control signals measured by the photodetector 24 are normalized, so as to remove the effects of stray radiation and intensity variation in the individual control signal RED's 11. Referring simultaneously to FIGS. 2 and 7, 4 extra normalization photodetectors 27 are located in a position such that it is able to detect the full intensity of the various phases from the opposing RED bank (A through L) before the radiation signals are modulated by the reticle 30. Thus, the normalization photodetectors 27 detect the full intensity of each phase (A though L) as if the opaque areas 33 of the reticle 30 had not blocked any part of the radiation signal. In this application, the signals measured by the normalization photodetectors 27 for each phase (A through L) are referred to as the "absolute intensities" of the phases (A through L). In this embodiment 4 silicon photodetectors 27 are used for this function and the signals from the 4 photodetectors averaged to derive the "absolute intensity" of the phases. The choice of detector and the number thereof represent a particular embodiment of the invention and other choices of photodetector configuration which may prove to be advantageous are also considered to be material to this invention, the important point being the normalization of the signals which is advantageous in lessening the sensitivity of the system to stray radiation. In accordance with the present invention, normalization of phases (A through L) is a two step process. The first step of the normalization procedure involves the subtraction of an offset from each phase (A through L) to account for background stray radiation that may be inadvertently measured by photodetector 24. As discussed above, the amount of the offset to be subtracted during normalization is uniquely determined for each switching unit 22 by its photodetector 24 during the period $t_o$ (see FIG. 6), where no phases (A through L) from the opposing "side" are being pulsed. Advantageously, the period of time $t_o$ can be adjusted in duration or interleaved with the pulsing of the phases (A through L) from the opposing side of the switch. In this manner, an offset can be measured by photodetector 24, which corresponds to each phase (A through L) on the same side of the switch. Thus, in the preferred embodiment, 12 different offset signals are generated, corresponding to the background radiation for each of the phases (A through L) on the same side of the switch. Although an average background offset can be used, the preferred embodiment's use of a unique offset for each of the same side phases (A through L) helps to compensate for varying amounts of stray radiation that may be measured by photodetector 24 during phases where the pulsing control signal RED's 11 on the same side may be closer of further away from that particular switching unit 22. After subtracting the appropriate offset for background radiation from each phase (A through L), in the second step of the normalization procedure, the controller takes the ratio of each phase signal (A through L) to that of the corresponding absolute intensity of the same phase (A through L) measured by normalization photodetector 27. This process of taking the ratio of the modulated signal to the un-modulated signal helps to reduce the effect of imperfections, which could lead to a variation in the measured radiation intensity between the different phases. Such imperfections include: non-uniformly performing RED's, corruption of the reticle by contaminants or by poor lithography, and variations in RED output caused by environmental temperature variations.

From this point forward in the disclosure, any discussion of the signals from the various phases (A through L) should be understood to refer to the normalized signals. In particular, all calculations performed by the controller in relation to determine the position of the reticle 30 are made using normalized control signals.

5.4 Calculation of the Coarse Position and the Fine Position

Referring to FIG. 7, the first step to uniquely identifying the absolute position of the fiber end 12' is to establish the position of the reticle 30 associated with that fiber 12 to within the area of a particular cell on that reticle 30. This process is referred to in this disclosure as calculating the "coarse position" of the fiber end 12'. In addition to determining the coarse position, the controller 47 also calculates the position of the fiber end 12' within the particular cell. This second process is referred to in this disclosure as determining the "fine position". It will be appreciated that the fiber end 12' is integrally connected to the reticle 30 in a particular switching unit 22; therefore, determining the coarse and fine positions of the reticle 30 yields the same information as determining the coarse and fine positions of the fiber end 12'. In this disclosure, any reference to calculation of the position of the reticle 30 should be understood to incorporate calculation of the position of the fiber end 12'. The manner in which the controller 47 uses the normalized phases (A through L) measured by photodetector 24 to determine the absolute position of the reticle 30 is explained most easily by considering a simple embodiment that incorporates the principles of the invention.

FIG. 14 depicts a simplified implementation that incorporates the principles and captures the essence of the position measurement system of the present invention. The embodiment depicted in FIG. 14-A requires only two radiation banks (21-A and 21-B) on each "side" of the switch, with each radiation bank (21-A and 21-B) having only three radiation stripes. Radiation bank 21-A has three radiation stripes (A, B and C) oriented along the x-axis and radiation bank 21-B has three radiation stripes (G, H and I) oriented along the orthogonal y-axis. Rather than having spatially periodic groups of radiation stripes that are pulsed at the same time, the phases (A, B, C, G, H and I) of radiation banks (21-A and 21-B) of FIG. 14 are comprised of only single radiation stripes (A, B, C, G, H and I) that are pulsed individually. FIG. 14-B depicts the images of the two radiation banks (21-A and 21-B) as they would appear on the reticle 30 of a switching unit 22 on the other "side" of the switch if all of the phases (A, B, C, G, H and I) were on simultaneously. The reticle 30 of the simplified embodiment is identical to that of the preferred embodiment, with a plurality of cells 34 having constant pitch $L_x$ in the x direction and $L_y$ in the y direction and a variable aperture duty cycle. For reasons of simplicity, FIG. 14-B does not show the apertures and the opaque areas of each of the cells 34.

In the simple implementation described by FIG. 14, the radiation banks (21-A and 21-B), the radiation stripes (A, B, C, G, H and I), and the optical system (not shown) are still selected to meet the size criteria discussed above. However, in the simplified embodiment, the images of each radiation bank (21-A and 21-B) on the reticle 30 are exactly the same size as one of the cells 34 in the reticle 30. This satisfies the size criteria, because the image on the reticle 30 of each of the radiation banks (21-A and 21-B) occupies an area equal to an integral number of cells (i.e. one). It will be appreciated that the periodicity criteria need not be satisfied by the simplified embodiment, because there is only one radiation stripe in each phase (A, B, C, G, H and I).

Figure 15:
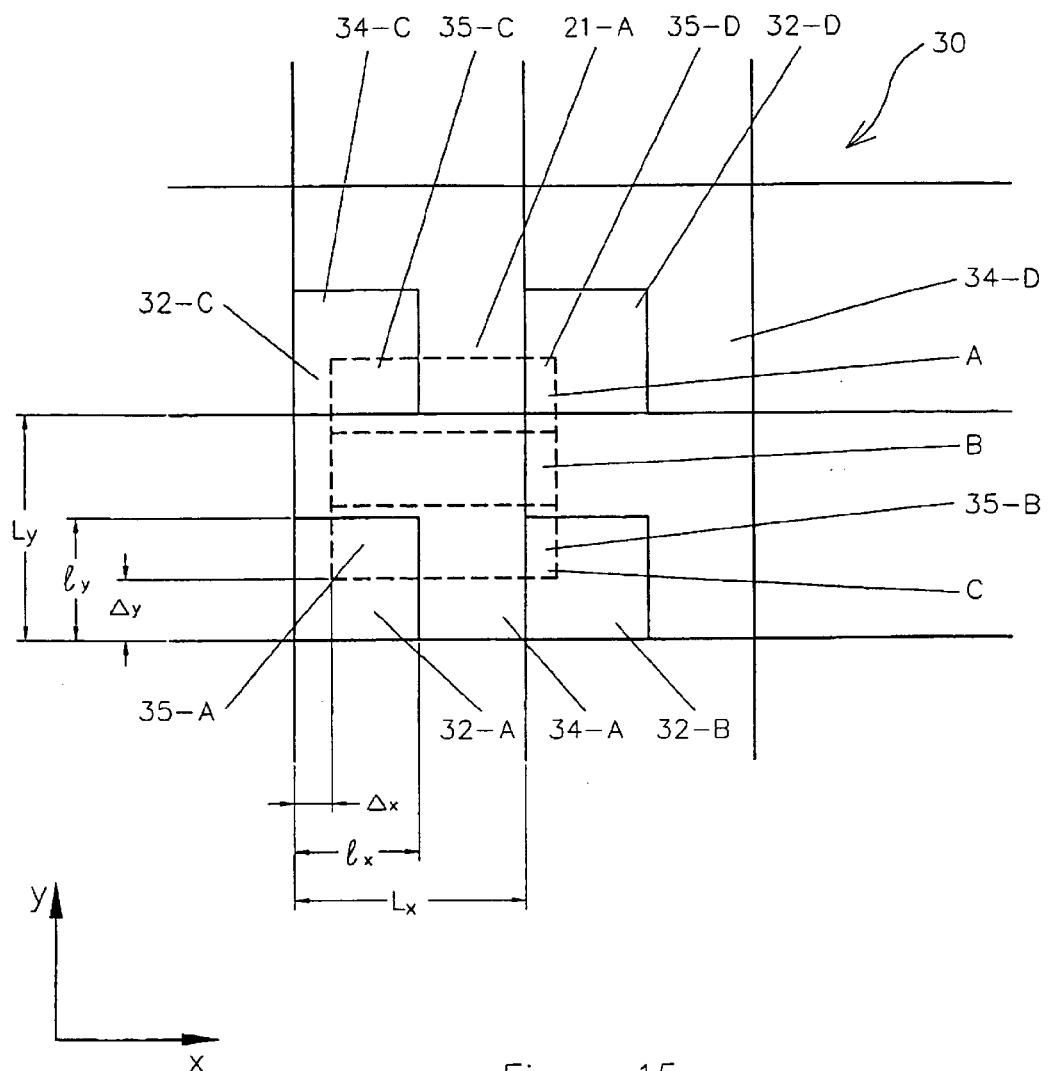
FIG. 15 shows the image of one of the simplified radiation banks of FIG. 14 on the reticle.

FIG. 15 depicts a close-up view of the image of the radiation bank 21-A on a reticle 30. Because the dimensions of the image of the radiation bank 21-A are $L_x$ by $L_y$ (i.e. the same as the cellular pitch of the reticle 30), the image of the radiation bank 21-A will overlap a maximum of four cells (34-A, 34-B, 34-C and 34-D). In the most general case, the image of the radiation bank 21-A will also overlap the apertures (32-A, 32-B, 32-C and 32-D) in each of the four cells (34-A, 34-B, 34-C and 34-D). In FIG. 15, the areas where the image of the radiation bank 21-A overlaps the apertures (32-A, 32-B, 32-C and 32-D) are designated (35-A, 35-B, 35-C and 35-D) respectively.

The photodetector (not shown in FIG. 15) behind the reticle 30 independently measures the intensity the transmitted radiation from each of the phases (A, B and C) and produces a corresponding electronic signal, which is sampled and normalized by the controller (not shown in FIG. 15) as described above. In the scenario depicted in FIG. 15, it will be appreciated that the signal from phase A will be proportional to the sum of areas 35-C and 35-D. Similarly, the signal from phase C will be proportional to the sum of the areas 35-A and 35-B. Clearly, there will be no appreciable signal transmitted from the image of phase B as it is completely blocked by the opaque areas of the reticle 30. It will be appreciated that the sum of the electronic signals generated from the three phases (A, B and C) in the radiation bank 21-A is proportional to the sum of the areas (35-A, 35-B, 35-C and 35-D) where the image of the radiation bank 21-A overlaps the apertures (32-A, 32-B, 32-C and 32-D) of the reticle 30.

Referring to FIG. 15, the sum of the signals transmitted through reticle 30 from each radiation stripe (A, B and C) is designated $I_1$, then:

$$I_1 \propto A_1 = A_{35A} + A_{35B} + A_{35C} + A_{35D} \approx (l_y - \Delta_y)(l_x - \Delta_x) + \Delta_x(l_y - \Delta_y) + \Delta_y(l_x - \Delta_x) + \Delta_x \Delta_y \quad (4)$$

where $l_x$ and $l_y$ are the dimensions of aperture 32-A and $\Delta y$ and $\Delta x$ represent the displacement (in both dimensions) of the image of the radiation bank 21-A from the corner of the cell 34-A. In general, equation (4) will hold true, provided that:

$$l_y - L_y < \Delta_y < l_y \quad (5a)$$

and $$l_x - L_x < \Delta_x < l_x \quad (5b)$$

When equation (4) is expanded and the like terms collected, it can be reduced to:

$$A_1 \approx l_y l_x \quad (6)$$

The approximation in equation (6) arises because of the variation in the size of neighbouring apertures 32. Equation (6) suggests that the signal $I_1$ representing the sum of the radiation stripes (A, B and C) is proportional to the area ($l_x l_y$) of the aperture 32-A in cell 34-A. The area ($l_x l_y$) of the aperture 32-A, however, is not enough to uniquely identify cell 34-A as the coarse position of the reticle 30 and the fiber end 12'.

However, recall equations (2) and (3):

$$l_x = L/3 + n_x L/(3N_x) \quad n_x = 0, 1, 2, \ldots N_x \quad (2)$$

$$l_y = L/3 + n_y L/(3N_y) \quad n_y = 0, 1, 2, \ldots N_y \quad (3)$$

Assume (for simplicity) that $L_x = L_y = L$ and suppose that cell 34-A has the indices $n_x = n_{x1}$ and $n_y = n_{y1}$, then equations (2) and (3) may be substituted into equation (6) to yield:

$$A_1 = \left(\frac{1}{3}L\right)^2 \left(1 + \frac{n_{x1}}{N_x}\right)\left(1 + \frac{n_{y1}}{N_y}\right) \quad (7)$$

Referring back to FIG. 14-B, the image of radiation bank 21-B must now be considered. It will be appreciated that radiation stripes (G, H and I) will cause the photodetector to produce similar electronic signals to those of radiation bank 21-A and that the controller may normalize those signals and generate a signal $I_2$ (similar to the signal 11) in respect of radiation bank 21-B. Assume that the image of radiation bank 21-B overlaps a cell indexed by $n_x = n_{x2}$ and $n_y = n_{y2}$. It can be seen from FIG. 14-B that $n_{y2} = n_{y1} = n_y$ and $n_{x2} = n_{x1} + N_d$, where $N_d$ is a known quantity that represents the distance between the image of radiation bank 21-A and the image of radiation bank 21-B as measured in the number of cellular pitches $L_x$. Thus, for signal $I_2$ from radiation bank 21-B, equation (7) may be rewritten:

$$A_2 = \left(\frac{1}{3}L\right)^2 \left(1 + \frac{n_{x1}}{N_x} + \frac{N_d}{N_x}\right)\left(1 + \frac{n_y}{N_y}\right) \quad (8)$$

Now if we take the difference between the signals $I_1$ and $I_2$, it may be seen that:

$$A_2 - A_1 = \left(\frac{1}{3}L\right)^2 \left(\frac{N_d}{N_x}\right)\left(1 + \frac{n_y}{N_y}\right) \quad (9)$$

In equation (9) all of the quantities are known with the exception of $n_{y1}$. Consequently, equation (9) may be solved for $n_{y1}$ and then the value of $n_{y1}$ may be substituted back into equation (7) to solve for $n_{x1}$. As a result, indices $n_{x1}$ and $n_{y1}$ are known and the absolute position of the reticle 30 is uniquely determined to within the cell 34-A that has the indices $n_{x1}$ and $n_{y1}$. That is, the coarse position of the reticle 30 is determined to be within the cell 34-A indexed by $n_{x1}$ and $n_{y1}$.

For the purposes of the algebraic explanation described above, equations (5a) and (5b) represent the mathematical boundaries of the cell 34-A. That is, if Δy or Δx falls outside of the range of equations (5a) or (5b), then the controller will determine the coarse position of the reticle 30 to be in a different cell. It should be noted here, that the construction of a cell with the aperture in the lower left-hand corner is simply a convenient tool for discussion of the invention. In general, the mathematical description of a cell may incorporate any type of cellular boundary, such as the one described in equations (5a) and (5b), provided that the dimensions of a cell are $L_x$ and $L_y$.

The algebraic explanation described above demonstrates how the controller can use the signals $I_1$ and $I_2$ to calculate the coarse position. As described above, the quantities $I_1$ and $I_2$ are derived by adding together the normalized signals from the various phases (A, B, C, G, H and I) for each of the radiation banks (21-A and 21-B). It will be appreciated, that depending on controller resources (i.e. memory, time, speed etc.), a controller can be programmed to use a predetermined look-up table to directly identify the coarse position from the measured values of $I_1$ and $I_2$, without having to reproduce the complex calculation for each measurement.

In general, the mathematical description given above demonstrates that using two radiation banks to illuminate two distinct areas on the reticle, a controller can uniquely determine the coarse position of the reticle, provided that the reticle has a constant cellular pitch and a known variation in aperture duty cycle. The determination of the coarse position yields the position of the reticle to within the area of a single cell. In practice there are many computational techniques that can be employed by a controller to derive the coarse position from the measurements of the various phases (A, B, C, G, H, and I). The invention should be understood to incorporate any mathematical and computational means of deriving the coarse position from the measurements of the various phases ((A, B, C, G, H, and I) and all of the other information that may be available to the controller. Such other information available to the controller may include information about the current or previous fine position measurement, the current or previous coarse position measurement and other data, such as calibration information and system specific information.

The above description of the preferred embodiment contemplates an absolute position measurement system that determines the absolute coarse position of the fiber end 12'. This absolute positional measurement involves determining the coarse position of the fiber end 12' without requiring reference information, such as a start position of the fiber end 12' or a reference signal. Although absolute position measurement is a preferred embodiment of the invention contemplated in this disclosure, the disclosure should be understood to include relative coarse position measurement. For example, a reticle could be used with a constant pitch on two dimensions and a non-varying aperture duty cycle. In such a case, the fiber end 12' could start from a reference position and the controller could simply count the number of cells that the fiber end 12' travelled from the reference position in each dimension. Such a technique would still be capable of providing the coarse position of the fiber end 12'. The invention should be considered sufficiently broad to incorporate the many types of well-known referential position encoding schemes.

As detailed in the mathematical explanation above, the controller can determine the coarse position of the reticle 30 and the fiber end 12' to within a particular cell using the normalized phases (A, B, C, G, H and I). The phases (A, B, C, G, H and I) may also be used to determine the fine position of the reticle 30 and the fiber end 12' to within the dimensions of the particular cell identified by the coarse position measurement. The fine position measurement is explained below.

Figure 16:
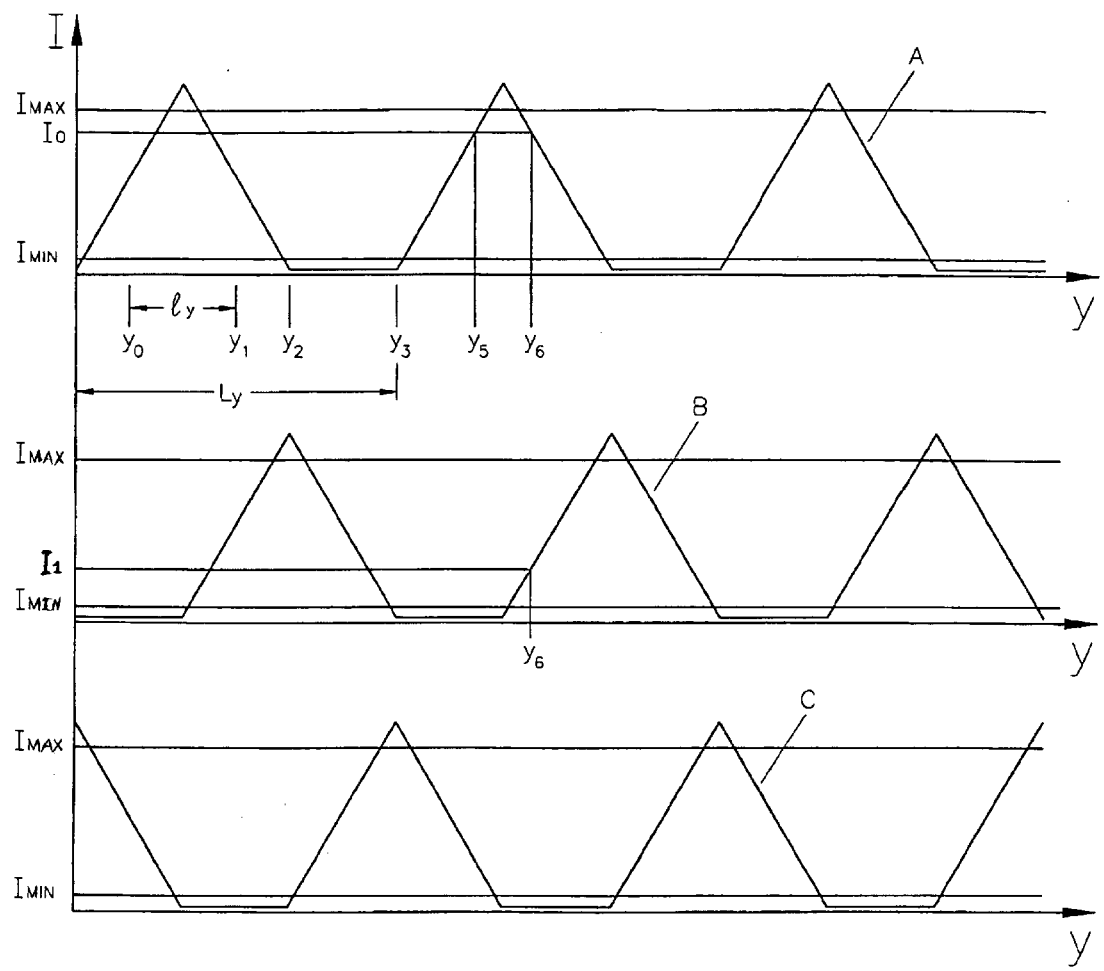
FIG. 16 depicts the spatial variation of the measured intensity signals associated with each of the three phases in one of the radiation banks. It can be seen from FIG. 16, that the three phases in the same radiation bank are substantially spatially periodic and that they have a substantially constant spatial phase relationship with one another.

FIG. 16 depicts idealized and normalized intensity signals from the three phases (A, B and C) for the simplified embodiment (see FIG. 14) as a function of the displacement of the reticle 30 and the fiber end 12' in the y direction. Looking at the signal corresponding to phase A, the portion of the signal between $y_0$ and $y_1$ represents the area that the image of radiation stripe A is directly overlapping an aperture 32 having a y-dimension $l_y$. For the portion of the signal between $y_2$ and $y_3$, the image of the radiation stripe A is completely hidden behind an opaque area 33 of the reticle 30 and, consequently, the intensity of phase A is near zero in this region. The period of each phase (A, B and C) is the pitch $L_y$ of the reticle 30 on the y-axis, but the duty cycle of each phase (A, B and C) varies slightly as the reticle 30 moves in the y-direction. The variation in duty cycle of the signals (A, B and C) is a result of the variation of the aperture duty cycle on the reticle 30. Even if the exact cell (i.e. the coarse position) is known, measurement of an intensity $I_o$ for phase A does not uniquely identify the fine position of the reticle 30, because the reticle 30 could be at position $y_5$ or $y_6$ within the same cell. Consequently, phase B or phase C must also be measured. It will be appreciated that if phase A is measured at $I_o$ and phase B is measured to have intensity $I_1$, then the fine position of the reticle 30 on the y-axis is determined to be $y_6$.

In some circumstances, measurement of a particular phase (A, B or C) may yield a result where the signal is in the zero-derivative range (i.e. at a peak) or in the region where the signal is in a flat region (i.e. phase A in the region between $y_2$ and $y_3$). Such a measurement may yield an indeterminate result, because the direction of movement cannot be concluded from the measurement of that particular phase. If phase A was measured and determined to be in such a state, then one of the other phases (B or C) must be used as the principal phase to determine the fine position. The simplest method to determine whether a first measured phase is in the indeterminate ranges and that another phase must be used as the principal phase to determine the fine position is simply to have thresholds, such as $I_{max}$ and $I_{min}$. If the intensity of phase A is measured to be above $I_{max}$, then it is too close to a peak and phase B or C must be used as the principal phase to determine the fine position. Similarly, phase B or C must also be used as the principal phase to determine the fine position when the intensity of phase A is measured to be below $I_{min}$. It will be appreciated that with aperture duty cycles that range from ⅓ to ⅔, at least one of the three phases A, B or C will be within the range between $I_{min}$ and $I_{max}$ and, therefore, be sensitive to small changes in position.

The process of determining the fine position on the x-axis is substantially similar to the process for determining the fine position on the y-axis described above. It will be appreciated that the three radiation stripes (G, H and I) depicted in FIG. 14 will produce phases with similar signals to those depicted in FIG. 16 as the reticle 30 moves on the x-axis. To ensure that the encoder is functional to capture the fine position on both axes, the two radiation banks 21-A and 21-B of the simplified embodiment depicted in FIG. 14 must have the elongated axes of their respective radiation stripes (A, B and C) and (G, H and I) oriented in orthogonal directions.

Figure 17:
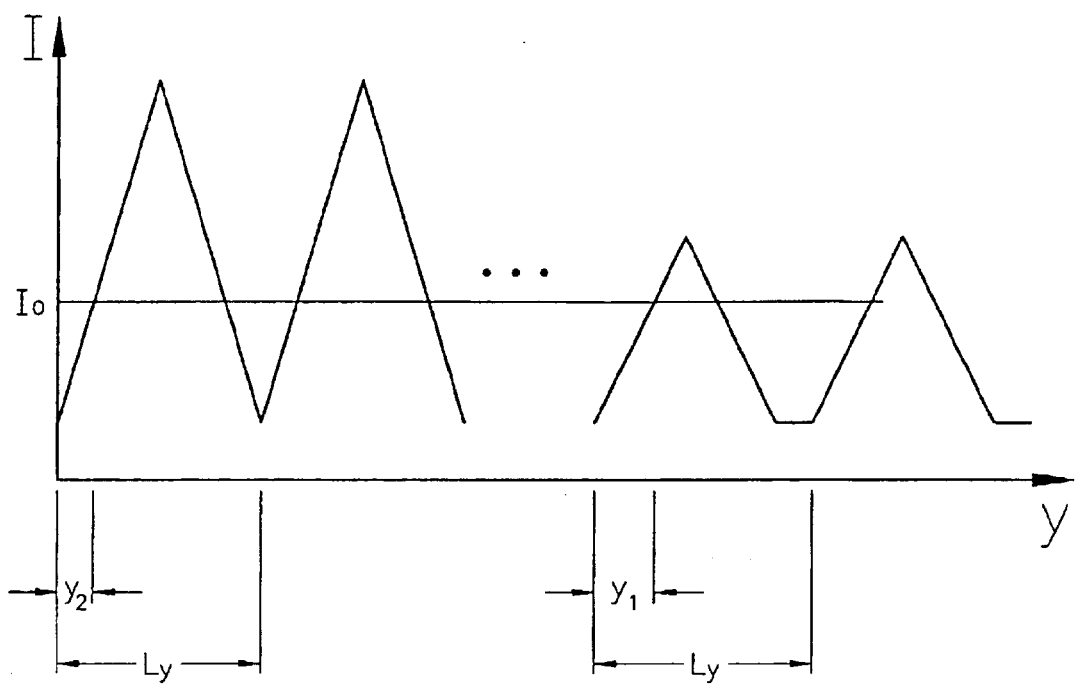
FIG. 17 depicts the spatial variation of a particular phase in one of the radiation banks in two distinct regions of the reticle. Because of the variation of the aperture duty cycle in the reticle, the measured intensity profile of the phase is plainly different in each such distinct region of the reticle.

The controllers of conventional Moiré-type encoders typically employ a single look-up table to determine the position of the reticle from the intensity of the phase signals. However, the present invention's variation in aperture duty cycle causes the intensity profile of a given phase signal to vary from cell to cell. That is, the measurement of a particular phase intensity will not always yield the same position within different cells. For example, when the aperture duty cycle is ⅓, a given signal intensity will correspond to a different fine position than when the aperture duty cycle is ⅔. This difference is depicted in FIG. 17, which illustrates several periods of a given phase signal in two regions of the reticle 30 with distinctly different aperture duty cycles. It can be seen that a given intensity $I_o$ corresponds to a different position within the cell depending on the aperture duty cycle of that particular cell. When the aperture duty cycle is approximately ⅓ (as in FIG. 17-B), a given intensity $I_o$ yields a fine position $y_1$ within the cell, but when the aperture duty cycle is approximately ⅔ (as in FIG. 17-A), the same intensity $I_o$ yields a different fine position $y_2$ within the cell.

Because of the variation in the aperture duty cycle that is fundamental to this invention, any look-up table that is used to accurately determine the fine position should be unique to a particular cell. For this reason, the coarse position of the reticle 30 and the fiber end 12' is calculated prior to accurate calculation of the fine position, so as to identify the particular look up table to be used.

Practically speaking, in a given switch implementation, it is known that movement of the fiber end 12' is only required to be within a predetermined range, which depends on the switch geometry and the number of switching units on the other "side" of the switch. Consequently, the controller can employ an "average" look-up table to determine an approximate fine position. For example, if the switch requires a range of movement of the fiber end 12' that is approximately 20 pitches of the reticle 30 in any given direction, then a look-up table comprising the average of a signal in those particular 400 cells may be used to determine an approximate fine position. This approximation technique allows a significant reduction in controller resources (i.e. speed, instruction cycles and memory). The use of the average look-up table to calculate an approximate fine position is independent of the actual cell in which the fine position is being determined. For this reason, the average look-up table technique has another advantage in that it does not require knowledge of the coarse position and may be employed concurrently (or prior to) the coarse position calculation.

In some instances (depending on controller resources and calculation time available), it may be suitable or advantageous to combine the average look-up table technique with the individual look-up table technique. A combination of these two techniques involves using the average look-up table first, to determine an approximate fine position. This initial procedure enables a rapid calculation of the approximate fine position and, subsequently, the coarse position may be calculated. After the coarse position measurement determines a particular cell, the fine position can be determined more accurately using a look-up table corresponding to that particular cell.

The explanation given above for the calculation of the coarse position and the fine position of the reticle 30 was given with reference to the simplified embodiment of FIGS. 14 and 15. In the preferred embodiment depicted in FIGS. 2, 5 and 13, four radiation banks (21-A, 21-B, 21-C and 21-D) are employed, rather than two radiation banks of the simplified embodiment. In addition, the phases of radiation banks (21-A, 21-B, 21-C and 21-D) in the preferred embodiment comprise spatially periodic groups of radiation stripes (A through L), rather than individual radiation stripes of the phases in the simplified embodiment. Finally, when the radiation banks (21-A, 21-B, 21-C and 21-D) of the preferred embodiment are imaged onto the surface of the reticle 30, their dimensions are larger than those of a single cell (i.e. $L_x$ by $L_y$).

The addition of the third and fourth radiation banks and the large size of the four radiation banks (21-A, 21-B, 21-C and 21-D) in the preferred embodiment improve the performance of the device. The description for the simplified embodiment discussed above is an ideal description used to facilitate simple explanation. In practice, there are many factors, such as potential rotation of the reticle 30, shadow from the fiber 12 and the effect of using round control signal RED's 11 (rather than perfectly shaped radiation stripes), which have a tendency to adversely affect the idealized performance of the device. The implementation of the larger and more numerous radiation banks (21-A, 21-B, 21-C and 21-D) in the preferred embodiment helps to reduce, identify and quantify these undesirable effects.

For example, having third and fourth radiation banks facilitates measurement of rotation of the reticle 30. Referring to the embodiment depicted in FIG. 5, radiation banks 21-A and 21-C are both made up of radiation stripes having their elongated axes oriented along the x direction. Thus, the various phases from either one of radiation banks 21-A or 21-C can be used to measure the fine position of the reticle 30 on its y-axis in a manner similar to that of the simplified embodiment described above. However, if the fine position measured by radiation bank 21-A is different from that measured by radiation bank 21-C, then the reticle 30 must have rotated in relation to the radiation banks (21-A, 21-B, 21-C and 21-D), which are rigidly mounted to the chassis on the other "side" of the switch. If the difference in the fine position determined using the signals from radiation banks 21-A and 21 C is $\delta_y$ and the separation between the radiation banks 21-A and 21-C is $N_d$, then the angular rotation θ in radians can be determined according to:

$$\theta = \sin^{-1}(\delta_y/N_d) \approx \delta_y/N_d \quad (10)$$

In addition to measuring rotation, the large size and large number of the radiation banks in the preferred embodiment provide extra light intensity and a larger area of coverage on the reticle surface. The additional light and area of coverage improve the signal to noise ratio of the device, which helps to overcome the practical difficulties associated with discrete RED sources and the shadow of the fiber 12. In addition, the large size and large number of radiation banks (21-A, 21-B, 21-C and 21-D) in the preferred embodiment, help to reduce the effects of surface defects, such as lithographic imperfections and impurities on the surface of the reticle 30.

In the simplified embodiment of FIGS. 14 and 15, the images of the radiation banks (21-A, and 21-C) are exactly the same size as a single cell in the reticle 30. In contrast, the images of the radiation banks (21-A, 21-B, 21-C and 21-D) on the reticle 30 in the preferred embodiment of FIGS. 2, 5 and 13 are larger than the dimensions of a cell. However, as discussed above, the area of each radiation bank image is equal to that of an integral number of cells. Provided that the area of the image of the radiation banks (21-A, 21-B, 21-C and 21-D) on the reticle 30 is equal to the area of an integral number of cells, the intensity of the sum of the signals from a given radiation bank will be determinative of the area of the apertures of the cells covered by that radiation bank image. This total aperture area will be approximately constant for a range up to one pitch in each direction. For example, the sum of the phases (A, C and E) from the image of radiation bank 21-A will be approximately constant for a range of up to one pitch in each direction. Having two or more radiation banks (21-A, 21-B, 21-C and 21-D) facilitates the calculation of the coarse position based on information available from the sums of the phases (A through L) from each such radiation bank (21-A, 21-B, 21-C and 21-D).

It will be appreciated that an algebraic calculation of the coarse position for the preferred embodiment with the four larger radiation banks (21-A, 21-B, 21-C and 21-D) as depicted in FIGS. 2, 5 and 13 is an extension of the same principles used for the simplified embodiment of FIGS. 14 and 15, except that the details of the calculation are slightly more complex. Because of the periodicity requirement of the phases (A through L), the calculation of the fine position is exactly the same in the preferred embodiment as it is in the simplified embodiment. Practically, however, it is easier to calculate the fine position in the preferred embodiment, because the signal to noise ratio is considerably improved with the large number of radiation stripes covered by the preferred embodiment's phases (A through L).

6.0 Alternative Embodiments and Improvements

Referring to the previously described embodiments of FIGS. 5 and 13, the reticle 30 is designed such that the aperture duty cycle varies linearly from cell to cell along the x and y axes in accordance with equations (2) and (3). As mentioned above, this linear relationship is not a requirement of the invention. One variation on the previously disclosed embodiments involves using a reticle (not shown) having multiple periodic variations of aperture duty cycle on each of the x and y axes. Such a reticle is said to have multiple "chirps". For example, the dimensions of the apertures of such a reticle could have two chirps on each dimension as described by the equations (2') and (3'):

$$l_x = L/3 + 2n_x L/(3N_x) \text{ for } n_x = 0, 1, 2, \ldots (N_x/2-1);$$

and $$l_x = L/3 + 2L(n_x - N_x/2)/(3N_x) \text{ for } n_x = (N_x/2), (N_x/2+1), \ldots N_x \quad (2')$$

$$l_y = L/3 + 2n_y L/(3N_y) \text{ for } n_y = 0, 1, 2, \ldots (N_y/2-1);$$

and $$l_y = L/3 + 2L(n_y - N_y/2)/(3N_y) \text{ for } n_y = (N_y/2), (N_y/2+1), \ldots N_y \quad (3')$$

Embodiments incorporating reticles with multiple chirps, such as the one described by equations (2') and (3'), are advantageous, because they can provide greater variation in aperture duty cycle as between adjacent cells. In this manner, it is easier for the coarse position measurement system to distinguish between immediately adjacent cells on the reticle. In order to implement an absolute position measurement encoder using a multiple chirp reticle, however, an additional piece of information is required, which relates to the chirp that the reticle presently occupies. This extra information can be obtained from a number of sources, including prior knowledge of the absolute position, the drive conditions imparted on the actuation system and a prediction of the resultant movement of the reticle. In addition, external reference sources of radiation may be used to indicate which chirp the reticle presently occupies.

In the specific embodiments described by FIGS. 5 and 13, the layout of the reticle 30 has been shown as a two dimensional grid, but there are many alternative embodiments that would also produce the Moiré interference patterns envisioned by the present invention. One such embodiment involves a modified reticle pattern as shown in FIG. 19A, wherein the reticle 99 is made up of concentric circles of opaque material 98, rather than an orthogonal grid. The layout of the radiation banks (21-A, 21-B, 21-C and 21-D) remains as a series of orthogonal radiation stripes (see FIG. 5). It is easy to appreciate that this arrangement of radiation banks (21-A, 21-B, 21-C and 21-D) still generates a Moiré interference pattern when projected and imaged onto the circularly patterned reticle 99.

A particular advantage in the embodiment of FIG. 19A is that the fiber measurement system becomes rotationally symmetric and it is no longer necessary to measure the angular rotation of the reticle 99 according to the method disclosed earlier.

The circularly oriented reticle 99 also provides absolute positional information over two dimensions, since the modulation level of the various phases (A through L) remains dependent on the location at which the various phases (A through L) are imaged onto the surface of the reticle 99. In some positions, the images of the various phases (A through L) alone will not be determinative of the absolute position. In such a scenario, the controller 47 can still resolve the absolute position of the fiber end 12' based on prior knowledge of the absolute position, the drive conditions imparted on the actuation system and a prediction of the resultant movement of the reticle 99.

In the circularly symmetric embodiment of FIG. 19, the contrast, for the control signal phases (A through L), between the lowest signal intensity and the highest signal level (i.e. the "modulation depth") will be less than the corresponding modulation depth of the preferred implementation, where both the reticle 30 and radiation stripes are oriented in orthogonal straight lines. It is possible, however, to compensate for the lower modulation depth of the phases by employing more (or higher intensity) RED's 11, so as to yield higher overall phase signal intensity and correspondingly higher signal to noise ration at the photodetector 24.

Improved performance can be obtained from the circularly oriented reticle 99 when it is used in combination with a layout of radiation banks that is somewhat different than that of FIG. 5. In the case of the reticle 99, it is advantageous to have the radiation banks, the radiation stripes and the corresponding RED's uniformly distributed on the chassis, so as to ensure that Moiré interference is produced for all positions at which the radiation banks (from one "side" of the switch) are imaged onto the surface of the reticle 99. One such radiation bank 97 is shown in FIG. 19B. In FIG. 19B, the control signal RED's 11 are arranged in a grid pattern and the multiplexing circuitry is designed such that the RED's 11 can be pulsed to create radiation stripes 96-A that are oriented in the x-axis direction (i.e. rows of RED's 11) or radiation stripes 96-B oriented in the y-axis direction (i.e. columns of RED's 11). Because the radiation stripes are pulsed in synchronization with the system clock, the phases can still be easily extracted by the photodetectors 24 on the opposing "sides" of the switch. The layout of FIG. 19B is also effective in increasing the overall light level from the Moiré interference by simply increasing the number of control signal RED's 11 that are employed.

Referring back to the previously described embodiments in FIGS. 5 and 13, two radiation banks (21-A and 21-C) have radiation stripes oriented along the x-axis and are responsible for the measurement of the fine position on the y-axis. In this section, the two radiation banks (21-A and 21-C) will be referred to as the "y-axis radiation banks". Similarly, the radiation banks (21-B and 21-D) have radiation stripes oriented along the y-axis, are responsible for measuring the fine position on the x-axis, and are referred to in this section as the "x-axis radiation banks".

Continuing to refer to the previously described embodiments of FIGS. 5 and 13, a difficulty associated with the previously described embodiments relates to undesirable cross-coupling of control signal modulation on the x and y axes. Ideally, radiation from the y-axis radiation banks (21-A and 21-C) would be impervious to movement of the reticle 30 along the x-axis. However, because of discrete RED radiation sources 11 and the variation in the size of adjacent apertures on the x-axis of the reticle 30, there is a small amount of modulation of the control signals from the y-axis radiation banks (21-A and 21-C) that results from the movement of the reticle 30 along the x-axis. Similarly, radiation from the x-axis radiation banks (21-B and 21-D) may be undesirably modulated by movement of the reticle 30 along the y-axis. This undesirable modulation is referred to as "coupling" or "cross-coupling" of the control signals on the x and y axes. In the previously described embodiments, the cross-coupling effect is removed by software algorithms contained in the controller code, that compensate the measured control signals. However, the cross-coupling of the control signals can also be physically removed by incorporating different embodiments of the radiation banks and the reticle.

In a first embodiment designed to eliminate the cross-coupling of the control signals from the fiber position measurement system, the control signal RED's 11 can be chosen to be different wavelengths for different radiation banks (21-A, 21-B, 21-C and 21-D) and the reticle can be made selectively permeable to these wavelengths. In this alternative embodiment, the y-axis radiation banks (21-A and 21-C) are selected to pulse control signal radiation at a particular wavelength and the x-axis radiation banks (21-B and 21-D) pulse control signal radiation at a second distinct wavelength. In addition, the embodiment employs a reticle similar to that of FIG. 11, but fabricated such that the reticle lines in the direction of the x-axis are made of a material that is opaque to only one of the control signal wavelengths, while the reticle lines in the direction of the y-axis are opaque to only the control signal wavelength. As will be described below, this embodiment decouples the measurement of the reticle position on the x-axis from the measurement of the reticle position on the y-axis and improves the signal to noise ratio of the position measurement system.

A convenient choice for the different wavelengths would be 940 nm and 830 nm, although it should be appreciated that many choices are available and the selection is based on availability of RED sources 11, the spectral response of the photodetector 24 and the availability of coating materials, which may be used to make the reticle lines that will selectively block one or the other wavelength.

Figure 20:
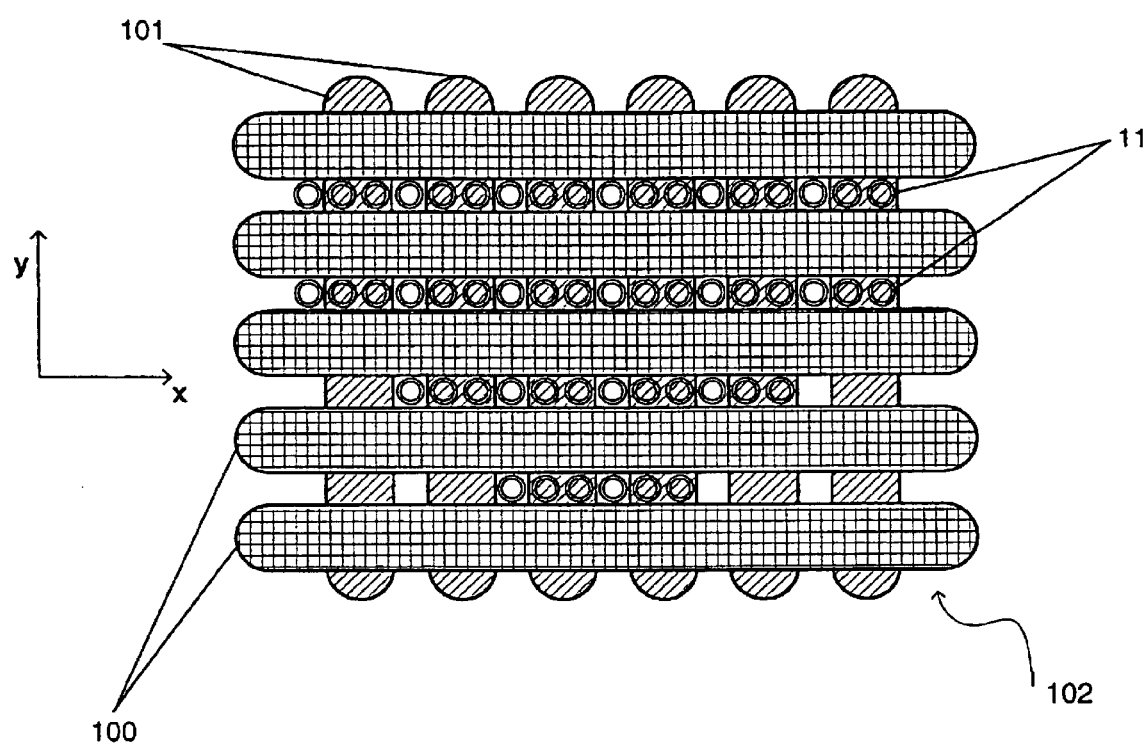
FIG. 20 depicts the image of a radiation bank and its associated RED's on the surface of a dual wavelength reticle associated with the a particular embodiment of the present invention.

The operation of the dual wavelength system can be explained with reference to FIG. 20. The image of a pattern of control signal RED's 11 from a particular y-axis radiation bank is shown superimposed over the reticle 102 as it would be if the RED's 11 were imaged onto the reticle 102 of a particular switching unit. For purposes of the discussion of this alternative embodiment, it is convenient to assume that the control signal RED's 11 of this particular y-axis radiation bank are chosen to have a wavelength of 940 nm. The reticle 102 is comprised of lines 100 oriented along the x-axis and lines 101 oriented along the y-axis. The lines 101 are opaque to radiation at 940 nm and transmit radiation at 830 nm, while the lines 100 are opaque to radiation at 830 nm and transmit radiation at 940 nm. FIG. 20 shows that the number of control signal RED's 11 that are transmitted by the reticle 102 to illuminate the photodetector 24 is increased considerably over the previously disclosed embodiments. This increase is a result of the transparency of lines 101 oriented on the y-axis to the radiation of the RED's 11 at λ=940 nm. In the previously disclosed embodiments, more radiation from the control signal RED's 11 was blocked by the opaque lines of the reticle 30 oriented on the y-axis. The increase in the number of detectable control signal RED's 11 for the dual wavelength embodiment represents a significant gain in the intensity of the control signals at the surface of the photodetector 24.

It should be understood that while the reticule 102 in FIG. 20 is shown with regularly spaced lines (100 and 101), it could also be fabricated with a variation in the aperture duty cycle. Such a fabrication could provide absolute positional information in a manner similar to that of the previously described embodiments.

As alluded to above, the arrangement of FIG. 20 has the added advantage that movements of the reticle 102 in the x and y directions will be decoupled from one another. Referring to FIG. 20 (and recalling the assumption that the RED's 11 therein depicted are at λ=940 nm), it can be seen that, because of the transparency of lines 101 to radiation at λ=940 nm, a movement of the reticle 102 along the x-axis direction has no effect on the control signal transmission. Similarly (although not shown), when RED's from an x-axis radiation bank are imaged onto the surface of the reticle 102, such control signal radiation will be impervious to movement of the reticle 120 in the y-axis direction. In this manner, the control signals from the x and y axes are physically decoupled from one another, without the need for the controller to employ software compensation schemes.

The fabrication of the dual wavelength reticle 102 is achieved either by a two step lithography process or by fabricating the required lines on two separate substrates and bonding them together. It should be appreciated that there are many well known procedures in the art that can be employed to fabricate such a reticle 102.

In yet another variation of the previously described embodiments designed to decouple the x and y movements, different polarizations (rather than different wavelengths) can be utilized for each of the x-axis and y-axis radiation banks. In such an embodiment, the y-axis radiation banks (21-A and 21-C) can have a polarizing material placed in front of their RED's 11, which transmits only light of a single polarization to be projected onto the reticle. An orthogonally oriented polarizing material is placed in front of the x-axis radiation banks (21-B and 21-D), so as to transmit radiation of orthogonal polarity onto the reticle. In a manner similar to that of the dual wavelength reticle 102 (see FIG. 20), the reticle in the dual polarization embodiment is patterned with selectively transmitting lines of polarizing material that transmit certain polarities and block orthogonal polarities. In this manner, the control signals for the measurement of the x-axis and y-axis positions can be independently extracted without the undesirable coupling effect. This dual polarization embodiment allows the use of a single wavelength control signal RED 11.

As will be appreciated by those versed in the art of optics, the invention disclosed here, while described in terms of a preferred embodiment based on the use of optical fibers, applies directly also to other carriers of optical beams. In this disclosure, therefore, the phrases "fiber" and "optical fiber" should be understood to include such a general carriers, conduits and channels of an optical beam. In the case of an optical fiber, the end of the fiber optically behaves like the combination of a lens and an optical aperture. In a more general case, therefore, the invention applies equally well to sets of opposed optical apertures through which emerge optical beams to be switched from any given one of the input apertures to any one of the output apertures. As with the ends of fibers manipulated by actuators in the case of the preferred embodiment, each input and output channel, in this more general alternative embodiment, is provided with an arrangement of optical elements positioned behind the associated aperture. The arrangement of elements, or an element in the arrangement, is manipulated to direct the beams between input and output apertures. Specifically a micromachined electrostatic mirror (MEMS) device may be employed to direct the beam. In this alternative embodiment a reference pattern is kept in fixed spatial relation to the relevant directing element.

It should be understood that the above descriptions of the simple and preferred embodiments are intended for illustrative purposes only, and are not intended to limit the scope of the present invention in any way. Those skilled in the art will appreciate that various modifications can be made to the embodiments discussed above without departing from the spirit of the present invention.

What is claimed is:

1. An optical fiber crass-connect switch comprising first and second groups of optical fiber switching units, disposed in optically opposing relation, each of the switching units in at least one of said first and second groups further comprising:

an optical fiber operative to conduct optical signals;

a position encoder comprising a reticle having a spatially varying pattern of interaction with radiation incident thereon, the encoder operative to detect a Moiré interference pattern and determine therefrom a position of at least one of: (i) an end of said optical fiber; (ii) an optical element operative to influence an optical path of an optical signals associated with said fiber; and (iii) a plurality of optical elements operative to influence an optical path of optical signals associated with said signal emitted from or coupled into the fiber; and an optical system configured to project one or more control signal radiation patterns.

2. A switch according to claim 1 wherein the reticle is positioned to receive the one or more control signal radiation patterns and to produce one or more corresponding Moiré interference patterns in response thereto.

3. A switch according to claim 2 wherein the encoder comprises a radiation sensor which is positioned to detect at least a portion of the one or more corresponding Moiré interference patterns and configured to generate a corresponding control signal in response thereto.

4. A switch according to claim 3 comprising a controller connected to receive the corresponding control signal and configured to determine a position of the reticle based on the corresponding control signal.

5. A switch according to claim 3 wherein the reticle has a spatially varying transmissivity and wherein the radiation sensor is located to detect radiation from the one or more control signal radiation patterns which have passed through the reticle.

6. A switch according to claim 3 wherein the reticle has a spatially varying reflectivity and wherein the radiation sensor is located to detect radiation from the one or more control signal radiation patterns which have reflected from the reticle.

7. A switch according to claim 3 wherein the reticle is patterned with a regular array of cells.

8. A switch according to claim 7 wherein each cell comprises an aperture portion and an opaque portion and wherein the reticle passes a first proportion of the control signal radiation patterns incident on the aperture portion to the radiation sensor and the reticle passes a second proportion, smaller than the first proportion, of the control signal radiation patterns incident on the opaque portion to the radiation sensor.

9. A switch according to claim 7 wherein each of the one or more control signal radiation patterns comprises a spatially periodic radiation pattern having a period substantially equal to a spatial periodicity of the array of cells.

10. A switch according to claim 9 wherein the cells of the array of cells are arranged in rows extending substantially parallel to a first axis and columns extending substantially parallel to a second axis and wherein each of the one or more control signal radiation patterns comprises a plurality of elongated stripes which are oriented substantially parallel to one of the first and second axes.

11. A switch according to claim 3 wherein the reticle comprises a circularly symmetric pattern of aperture areas and opaque areas and wherein the reticle passes a first proportion of the control signal radiation patterns incident on the aperture areas to the radiation sensor and the reticle passes a second proportion, smaller than the first proportion, of the control signal radiation patterns incident on the opaque areas to the radiation sensor.

12. A switch according to claim 3 wherein each of the one or more control signal radiation patterns comprises a plurality of elongated stripes of radiation.

13. A switch according to claim 3 wherein each of the one or more control signal radiation patterns comprises a spatially periodic radiation pattern.

14. A switch according to claim 3 wherein the one or more control signal radiation patterns comprise at least one radiation pattern having a first wavelength and at least one radiation pattern having a second wavelength.

15. A switch according to claim 3 wherein the optical system comprises an array of radiation emitting devices which are located in positions optically opposing one of: the first group of optical fiber switching units and the second group of optical fiber switching units.

16. A switch according to claim 15 wherein the optical system is configured to project the one or more control signal radiation patterns by turning on selected pluralities of the radiation emitting devices.

17. A switch according to claim 15 wherein individual ones of the radiation emitting devices are located between a plurality of optical switching units in the first group of optical fiber switching units.

18. A switch according to claim 15 wherein individual ones of the radiation emitting devices are located between a plurality of optical switching units in the second group of optical fiber switching units.

19. A switch according to claim 3 wherein the encoder comprises a lens which is located and shaped to focus the one or more control signal radiation patterns onto the reticle.

20. A switch according to claim 19 wherein the lens in located and shaped to couple an optical communication signal from a selected one of a plurality of optically opposed switching units into the optical fiber of its associated switching unit.

21. A switch according to claim 19 wherein the lens is located and shaped to collect an optical communication signal emitted from its associated optical fiber and direct the optical communication signal towards a selected one of a plurality of optically opposed switching units.

22. A switch according to claim 3 wherein the reticle is coupled to move with its associated optical fiber, and wherein the one or more corresponding Moiré interference patterns vary in intensity based on a position of the reticle.

23. A switch according to claim 22 comprising a controller connected to receive the corresponding control signal from the radiation sensor and configured to determine a position of the optical fiber based on the corresponding control signal.

24. A switch according to claim 3 wherein the reticle is coupled to move with its associated optical element, and wherein the one or more corresponding Moiré interference patterns vary in intensity based on a position of the reticle.

25. A switch according to claim 24 comprising a controller connected to receive the corresponding control signal from the radiation sensor and configured to determine a position of the optical element based on the corresponding control signal.

26. An optical fiber cross-connect switch comprising first and second groups of optical fiber switching units, disposed in optically opposing relation, each of the switching units in at least one of said first and second groups further comprising:
   an optical fiber operative to conduct optical signals; and
   a position encoder operative to detect a Moiré interference pattern and determine therefrom a position of at least one of: (i) an end of said optical, fiber; (ii) an optical element operative to influence an optical path of optical signals associated with said fiber; and (iii) a plurality of optical elements operative to influence an optical path of optical signals associated with said signal emitted from or coupled into the fiber;
wherein each of the switching units in at least one of the first and second groups further comprises an actuator having a magnetic member coupled to move with the optical fiber and a plurality of magnetically polarizable branches spaced apart around the magnetic member.

27. A switch according to claim 26 wherein the magnetic member is circularly symmetric.

28. A switch according to claim 27 wherein the magnetic member comprises a ring of magnetic material.

29. A switch according to claim 27 wherein the encoder comprises a reticle having a spatially varying pattern of interaction with radiation incident thereon and wherein the ring extends around a peripheral edge of the reticle.

30. A switch according to claim 29 wherein the ring comprises a ferrite material.

31. A switch according to claim 27 wherein the actuator comprises four branches which are equally spaced apart around the magnetic member.

32. A method for switching an input optical signal between any of a plurality of output signal channels in an optical cross-connect switch, the method comprising:
   detecting a Moiré interference pattern an determining therefrom a position of at least one of: a receiving end of one of said output signal channels and a transmitting end of an input signal channel associated with said input optical signals;
   generating one or more output Moiré interference patterns using first control signal radiation, the one or more output Moiré interference patterns varying with a position of the receiving end of the one of said output signal channels;
   detecting at least a portion of the one or more output Moiré interference patterns; and
   based at least in part on the detected portion of the one or more output Moiré interference patterns, determining the position of the receiving end of the one of said output signal channels.

33. A method according to claim 32 wherein generating one or more output Moiré interference patterns comprises projecting the first control signal radiation onto an output reticle coupled to move with the one of said output signal channels, the output reticle having a spatially varying pattern of interaction with radiation incident thereon.

34. A method according to claim 33 wherein determining the position of the receiving end of the one of said output signal channels comprises determining a position of the output reticle.

35. A method according to claim 34 comprising:
  generating one or more input Moiré interference patterns using second control signal radiation, the one or more input Moiré interference patterns varying with a position of the transmitting end of the input signal channel associated with said input optical signal;
  detecting at least a portion of the one or more input Moiré interference patterns; and
  based at least in part on the detected portion of the one or more input Moiré interference patterns, determining the position of the transmitting end of the input signal channel associated with said input optical signal.

36. A method according to claim 35 wherein generating one or more input Moiré interference patterns comprises projecting the second control signal radiation onto an input reticle coupled to move with the input signal channel, the input reticle having a spatially varying pattern of interaction with radiation incident thereon.

37. A method according to claim 36 wherein determining the position of the transmitting end of the input signal channel comprises determining a position of the input reticle.

38. A method according to claim 37 wherein each of the input and output reticles have a spatially varying transmissivity and wherein detecting at least a portion of the one or more output Moiré interference patterns comprises detecting a portion of the first control signal radiation which has passed through the output reticle and detecting at least a portion of the one or more input Moiré interference patterns comprises detecting a portion of the second control signal radiation which has passed through the input reticle.

39. A method according to claim 37 wherein each of the input and output reticles have a spatially varying reflectivity and wherein detecting at least a portion of the one or more output Moiré interference patterns comprises detecting a portion of the first control signal radiation which has reflected from the output reticle and detecting at least a portion of the one or more input Moiré interference patterns comprises detecting a portion of the second control signal radiation which has reflected from the input reticle.

40. A method according to claim 37 wherein each of the input and output reticles is patterned with a regular array of cells.

41. A method according to claim 40 wherein each cell of the array of cells comprises an aperture portion and an opaque portion and wherein:
  (a) detecting at least a portion of the one or more output Moiré interference patterns comprises detecting a first proportion of the first control signal radiation that is incident on and passes through the aperture portion and detecting a second proportion, smaller than the first proportion, of the first control signal radiation that is incident on and passes through the opaque portion; and
  (b) detecting at least a portion of the one or more input Moiré interference patterns comprises detecting a first proportion of the second control signal radiation that is incident on and passes through the aperture portion and detecting a second proportion, smaller than the first proportion, of the second control signal radiation that is incident on and passes through the opaque portion.

42. A method according to claim 40 wherein projecting the first control signal radiation onto the output reticle comprises projecting one or more spatially periodic radiation patterns onto the output reticle, the spatially periodic radiation patterns having a period substantially equal to a spatial periodicity of the cells of the array of cells of the output reticle and projecting the second control signal radiation onto the input reticle comprises projecting one or more spatially periodic radiation patterns onto the input reticle, the spatially periodic radiation patterns having a period substantially equal to a spatial periodicity of the cells of the array of cells of the input reticle.

43. A method according to claim 42 wherein the cells of the arrays of cells of the input and output reticles are arranged in rows extending substantially parallel to a first axis and columns extending substantially parallel to a second axis and wherein projecting the first control signal radiation onto the output reticle comprises projecting elongated stripes of radiation which are oriented substantially parallel to one of the first and second axes and projecting the second control signal radiation onto the input reticle comprises projecting elongated stripes of radiation which are oriented substantially parallel to one of the first and second axes.

44. A method according to claim 37 wherein each of the input and output reticles comprises a circularly symmetric pattern of aperture areas and opaque areas and wherein:
  (a) detecting at least a portion of the one or more output Moiré interference patterns comprises detecting a first proportion of the first control signal radiation that is incident on and passes through the aperture areas and detecting a second proportion, smaller than the first proportion, of the first control signal radiation that is incident on and passes through the opaque areas; and
  (b) detecting at least a portion of the one or more input Moiré interference patterns comprises detecting a first proportion of the second control signal radiation that is incident on and passes through the aperture areas and detecting a second proportion, smaller than the first proportion, of the second control signal radiation that is incident on and passes through the opaque areas.

45. A method according to claim 37 wherein projecting the first control signal radiation onto the output reticle comprises projecting a plurality of elongated stripes of radiation onto the output reticle and projecting the second control signal radiation onto the input reticle comprises projecting a plurality of elongated stripes of radiation onto the input reticle.

46. A method according to claim 37 wherein projecting the first control signal radiation onto the output reticle comprises projecting one or more spatially periodic radiation patterns onto the output reticle and projecting the second control signal radiation onto the input reticle comprises projecting one or more spatially periodic radiation patterns onto the input reticle.

47. A method according to claim 37 wherein projecting the first control signal radiation onto the output reticle comprises projecting at least one radiation pattern having a first wavelength onto the output reticle and projecting at least one radiation pattern having a second wavelength onto the output reticle and wherein projecting the second control signal radiation onto the input reticle comprises projecting at least one radiation pattern having the first wavelength onto the input reticle and projecting at least one radiation pattern having the second wavelength onto the input reticle.

48. A method according to claim 37 wherein projecting the first control signal radiation onto the output reticle comprises imaging a plurality of individual radiation emitting device onto the output reticle and wherein projecting the second control signal radiation onto the input reticle comprises imaging a plurality of individual radiation emitting devices onto the input reticle.

49. A method according to claim 37 comprising moving the receiving end of the one of said output signal channels to a position that substantially maximizes the coupling of said input optical signal into the one of said output signal channels.

50. A method according to claim 49 comprising moving the transmitting end of the input signal channel associated with said input optical signal to a position that substantially maximizes the coupling of said input optical signal into the one of said output signal channels.

51. A method according to claim 33 comprising moving the receiving end of the one of said output signal channels to a position that substantially maximizes the coupling of said input optical signal into the one of said output signal channels.

52. A method for switching an optical communication signal emitted from a first optical fiber between any of a plurality of second optical fibers in an optical cross-connect switch, said method comprising:

detecting a Moiré interference pattern and determining therefrom a position of at least one of: (a) an end of said first optical fiber; (b) an end of one of said second optical fibers; (c) an optical element operative to influence an optical path between said first optical fiber and one of said second optical fibers; and (d) a plurality of optical elements operative to influence an optical path between said first optical fiber and one of said second optical fibers;

wherein the optical element operative to influence an optical path between said first optical fiber and the one of said second optical fibers comprises a moveable optical element and wherein a position of the moveable optical element influences the optical path between said first optical fiber and the one of said second optical fibers; and generating one or more Moiré interference patterns by projecting control signal radiation onto a reticle coupled to move with the moveable optical element, the reticle having a spatially varying pattern of interaction with radiation incident thereon.

53. A method according to claim 52 comprising determining a position of the moveable optical element by determining a position of the reticle.

54. A method according to claim 53 comprising moving the moveable optical element to a position that substantially maximizes the coupling of the optical communication signal between said first optical fiber and the one of said second optical fibers.

55. A method for switching an optical communication signal emitted from a first optical fiber between any of a plurality of second optical fibers in an optical cross-connect switch, said method comprising:

detecting a Moiré interference pattern and determining therefrom a position of at least one of: (a) an end of said, first optical fiber; (b) an end of one of said second optical fibers; (c) an optical element operative to influence an optical path between said first optical fiber and one of said second optical fibers; and (d) a plurality of optical elements operative to influence an optical path between said first optical fiber and one of said second optical fibers;

wherein the plurality of optical elements operative to influence an optical path between said first optical fiber and the one of said second optical fibers comprises a plurality of moveable optical elements and wherein respective positions of the moveable optical elements influence the optical path between said first optical fiber and the one of said second optical fibers.

56. A method according to claim 55 comprising generating one or more Moiré interference patterns by projecting control signal radiation onto a plurality of reticles, each reticle coupled to move with a corresponding one of the plurality of moveable optical elements and each reticle having a spatially varying pattern of interaction with radiation incident thereon.

57. A method according to claim 56 comprising determining the respective positions of the plurality of moveable optical elements by determining respective positions of their corresponding reticles.

58. A method according to claim 57 comprising moving the plurality of moveable optical elements to positions that substantially maximize the coupling of the optical communication signal between said first optical fiber and the one of said second optical fibers.

* * * * *